United States Patent [19]
Morningstar et al.

[11] Patent Number: 6,006,280
[45] Date of Patent: Dec. 21, 1999

[54] DISTRIBUTED INSTANTIATION SYSTEM AND METHOD

[75] Inventors: Charles B. Morningstar; F. Randall Farmer, both of Palo Alto, Calif.

[73] Assignee: Communities.com, Cupertino, Calif.

[21] Appl. No.: 08/628,894

[22] Filed: Apr. 9, 1996

[51] Int. Cl.$^6$ ...................................................... G06F 9/46
[52] U.S. Cl. ............................................................ 709/303
[58] Field of Search .................................... 395/680, 683; 709/300, 303

[56] References Cited

PUBLICATIONS (no author given) ORB 2.0 RFP Submission, OMG TC Document 94.9.32, pp. 1–109, Sep. 1994.
Betz, Mark, "Interoperable objects: laying the foundation for distributed–object computing", Dr. Dobbs Journal, v19, N11, p18(13), Oct. 1994.
Manola, Frank, "Interoperability Issues in Large–Scale Distributed Object Systems", ACM Computing Surveys, vol. 27, No. 2, pp.(3), Jun. 1995.

*Primary Examiner*—Alvin E. Oberley
*Assistant Examiner*—St. John Courtenay, III
*Attorney, Agent, or Firm*—Philip H. Albert; Townsend and Townsend and Crew

[57] ABSTRACT

A communication system and method includes unums distributed over at least a single presence and including a selected plurality of ingredients. An unum is established by creating ingredients at the level of its interface and attributes; and at the level of its implementation; and interconnecting ingredients into presences and unums. Communication between ingredients is accomplished within a single presence, across an unum boundary within an agency, or within a single unum across a presence boundary. Trust boundaries are established between presences and unums to establish a predetermined level of communications security in messaging between ingredients.

10 Claims, 16 Drawing Sheets

DISTRIBUTED INSTANTIATION SYSTEM AND METHOD

TECHNICAL FIELD OF THE INVENTION

This invention relates to systems and methods for communicating information in a distributed information system.

BACKGROUND

Objects can have an object oriented programming (OOP) meaning, as used in Smalltalk or C++ . An OOP object includes data (i.e., variables and states which are not directly viewable) and executable code encapsulating a selected program concept (i.e., behaviors and programmatic methods to which the object responds to). A Smalltalk or C++ object distinguishes between a class and an instance. A class is a template described by a class definition (in Smalltalk by an explicit Class object, in C++ by a class declaration). Each instance is described by the class definition for its class. Class definitions are largely code entities. However, instances contain state information which can vary from instance to instance.

However, irrespective of how defined, currently known distributed objects are organized in a hierarchy controlled at a server node. Such a hierarchical distributed object organization is inflexible, because all control is exercised by a server. For network participants not controlling the server, the result is operational impotence.

Currently, individuals developing object oriented distributed systems may follow a model in which state information with respect to selected objects of a distributed system is replicated in each object with respect to selected other objects of a particular distributed system. Another approach to developing object oriented distributed systems follows a model in which state information with respect to selected objects of a distributed system must be explicitly communicated for each object with respect to selected other objects of a particular distributed system. Either approach is accompanied by undesired overhead which hampers operability. The first form or approach to developing distributed object oriented systems has undue overhead due to excessive replication of state information. The second approach to developing distributed object oriented systems is hampered by excessive communications overhead involving objects obtaining state information from each other. It is according desirable to develop a distributed object oriented system which optimizes the sharing and retention of state information between objects which are established for interoperability with each other.

SUMMARY OF THE INVENTION

According to an embodiment of the present invention, an object oriented system includes distributed object ingredients resident in a plurality of associated agencies. Each of the distributed object ingredients includes state information organizing the object ingredients as resident in particular presences associated with a selected unum distributed over several agencies. The state information linking the related object ingredients includes replicated references associating object ingredients as belonging to presences on particular agencies. Selected presences are associated with each other in an unum spanning several agencies. The ingredient objects belonging to a common unum can communicate directly with each other over agency boundaries by virtue of a trust boundary traversing agency boundaries. Similarly ingredient objects belonging to a common agency can communicate directly with each other over unum boundaries by virtue of a trust boundary traversing unum boundaries. The various trust boundaries are established by reference state information in each ingredient object. The references establish the allegiance of a particular ingredient object to a particular unum and to a particular agency. The references thus make clear the allegiance of a particular ingredient object to a particular unum object.

The advantage of organizing ingredient objects according to unums distributed over several agencies is that an operable distributed system of users can communicate with object oriented messages without having to engage in explicit machine to machine or agency to agency communication. By becoming a member of an unum system, simple, direct intercommunication is enabled without having to communicate explicitly across machine or agency boundaries.

According to the present invention, an object oriented communication system and method includes at least a single unum distributed over at least a single presence and including a selected plurality of ingredients.

According to one embodiment, the communication system and method of the present invention includes but is not limited to an arrangement of interreferenced ingredient objects having predetermined behaviors and predetermined states and reference states establishing ingredient object residence on a particular agency or machine, and object interassociation in a common presence within an unum. The reference states of an ingredient object in accordance with the present invention establish an embedded association of ingredient objects which can communicate with each other as a result of their containing a common reference state establishing their being locally associated within a single presence. The reference states of an ingredient object in accordance with the present invention further establish an embedded association of ingredient objects which can communicate with each other as a result of their containing a common reference state establishing their being locally associated within a single agency but not within a common unum. The reference states of an ingredient object in accordance with the present invention further establish an embedded association of ingredient objects which can communicate with each other as a result of their containing a common reference state establishing their being locally associated within a common unum but not within the same agency.

An agency according to an embodiment of the present invention can be a single machine, computer, microprocessor, or a network of machines, computers or microprocessors. A presence according to an embodiment of the present invention is a collection of ingredient objects within the definition of an unum, which are all within a particular agency.

According an embodiment of the present invention, an unum includes ingredient objects and presences distributed across a network of agencies. More particularly, according to an embodiment of the present invention, an unum is an object which spans a plurality of agencies with at least a single presence in each spanned agency. A presence is a distributed local portion of the unum object which is resident on a particular agency. A particular presence does not contain the complete state of an unum, in the general case, nor can it implement the entire unum behavior, in the general case. An agency may denote an individual computer, a particular process on an individual computer, a multiprocessor operating as a single unit, or another computational system that operates as a unitary entity as seen by the external world. Agencies according to the present invention communicate with each other over a virtual or physical network, through the specific operational properties of the network including, but not limited to, bandwidth, latency, reliability, cost, and topology.

An unum according to the present invention is an instance of a particular unum kind. Each unum kind is described by an unum kind definition. An unum kind definition consists of an unum interface and an unum composition. The unum interface defines the message protocol that the unum presents to other unums (i.e., to the rest of the world). The unum composition defines the internal structure of the unum. Each unum instance according to the present invention is a unique entity. However, unum instances may be distributed across agencies. The portion of an unum instance which is found on a particular agency is called a presence. Each presence exists on a single agency. An unum composition includes a set of presence kinds. Every presence according to the present invention is an instance of particular presence kind. Each presence kind is described by a presence kind definition. A presence kind definition includes a presence interface and a presence composition. The presence interface defines a message protocol that the presence presents to the other presences of the same unum. The presence composition defines the internal structure of the presence. Each presence is a unique entity. All presences of a particular presence kind share a common interface and composition. A presence composition defines a set of ingredients that collectively determine the appearance, behavior and internal structure of instances of the presence kind. Every ingredient according to the present invention has an ingredient kind. Ingredient kinds are defined independent of specific unum designs and can be shared in common by different kinds of unum. Each ingredient kind is described by an ingredient kind definition. An ingredient kind definition includes an ingredient interface, an ingredient state descriptor, and one or more particular ingredient implementations. The ingredient interface according to the present invention defines the message protocol that the ingredient presents to other ingredients within the same presence. The ingredient state descriptor defines a set of state information internal to the ingredient which are instantiated for each instance of the presence of which the ingredient is an ingredient. An ingredient implementation is the realization of the ingredient on a selected platform (e.g., Windows) or in terms of some particular standard (e.g., JPEG). Ingredient state information according to the present invention is maintained on a per-instance basis. The state of a particular ingredient is contained in a set of typed, named fields, each of which functions as a state variable. All the ingredients of all the presences of a particular unum collectively maintain the total state of the unum. The state maintained in a presence includes a joint state and a local state. An ingredient contributes to one of these two kind of state information. Such ingredients are called joint ingredients and local ingredients, respectively. The local state according to the present invention is known only to the particular agency on which that presence is found and is not shared with others. A field of a local ingredient is visible only to that ingredient. The joint state according to the present invention is known to all presences of the unum and is shared in common among them. While the fields of a joint ingredient are scoped in the same way the fields of a local ingredient are, a copy of any given joint ingredient is found in all presences, and its state is the same in all presences (neglecting differences due to communications delays). Ingredients, presences and unums communicate with each other via messages. Ingredients can only communicate with other ingredients of the same presence, and presences can only communicate with other presences of the same unum (between agencies) and unums can only communicate with other unums in the same agency.

According to the present invention, an unum is an object distributed over a plurality of agencies, which establishes an intra-unum/inter-agency communication trust boundary. Further according to the present invention, a presence is a agency local instance of an unum inside this trust boundary. Further according to the present invention, an ingredient is a component part of an presence. Further according to the present invention, an agency is a logical process instantiated over a predetermined number of unums.

According to the present invention, an unum is established by creating ingredients at the level of its interface and attributes, and at the level of its implementation; and interconnecting ingredients into presences and unums.

According to the present invention, ingredients are able to communicate with other ingredients within a presence (on the same agency,) through an ingredient interface, as well as across an unum boundary through an unum interface.

Further according to the present invention, an ingredient can communicate directly with a presence other than its own, within the same unum through a presence interface.

Further according to the present invention, an ingredient can communicate directly with another unum within its own agency.

DETAILED DESCRIPTION OF THE INVENTION

Minimum Unum Instance

Figure 1A:
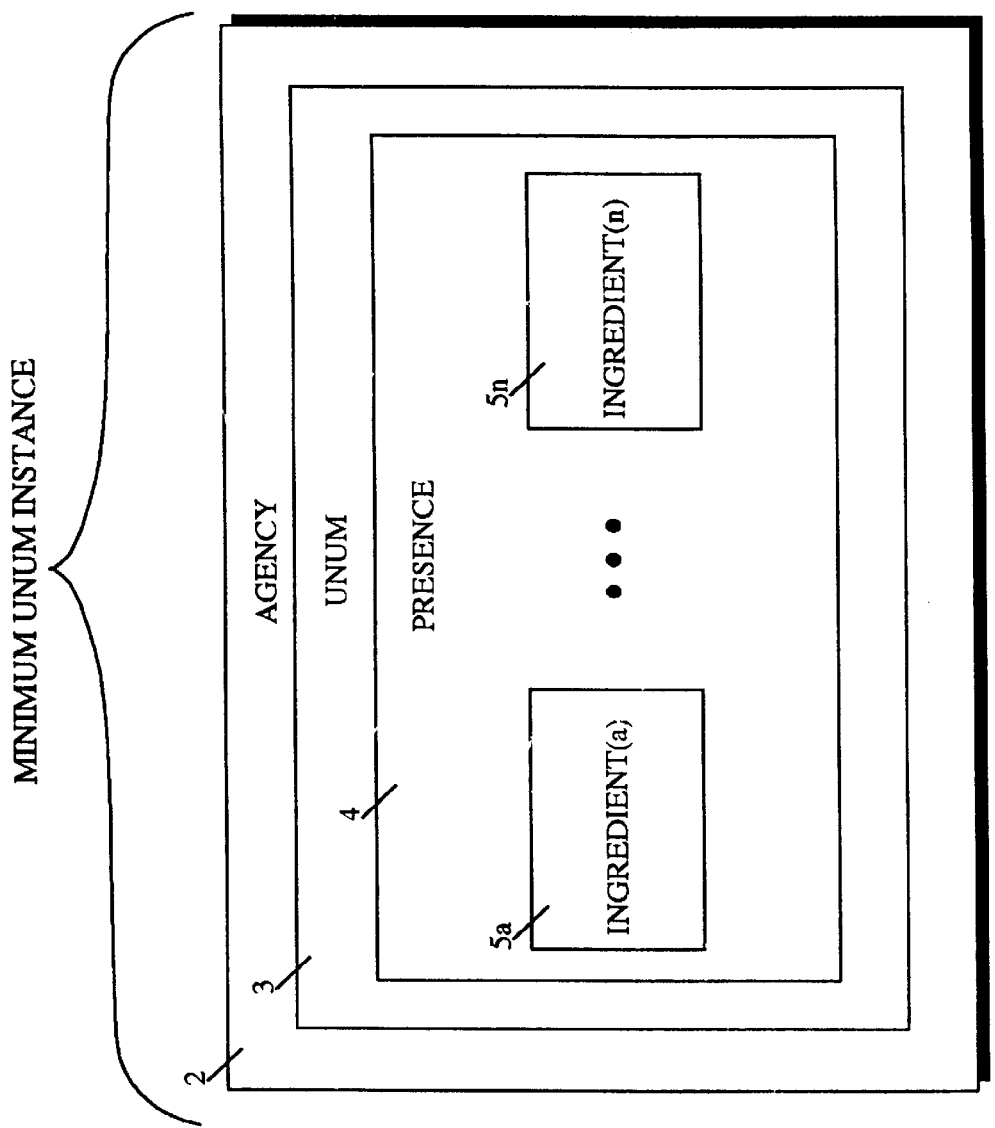
FIG. 1a is a block diagram of an unum according to the present invention including a presence and a selected number of ingredients.

FIG. 1a is a block diagram of an agency (or machine) 2 including an unum 3 according to the present invention including a presence 4 and a selected number of ingredients 5a–5n. The plural of unum is una or unums. An unum 3 comprises a selected group of one or more presences 4. A presence 4 in turn comprises at least a single ingredient, as will be described in greater detail below. Each unum 3 is distributed over at least a single presence 4. Presence 4 is the portion of unum 3 which resides on a single agency. Presence 4 further includes a plurality of ingredients 5a–5n. Each ingredient 5a–5n is an object (in the traditional, object-oriented programming sense) and may contain state or variable information. One or more ingredients 5a–5n comprise presence 4.

Communication Between Ingredients

Figure 1B:
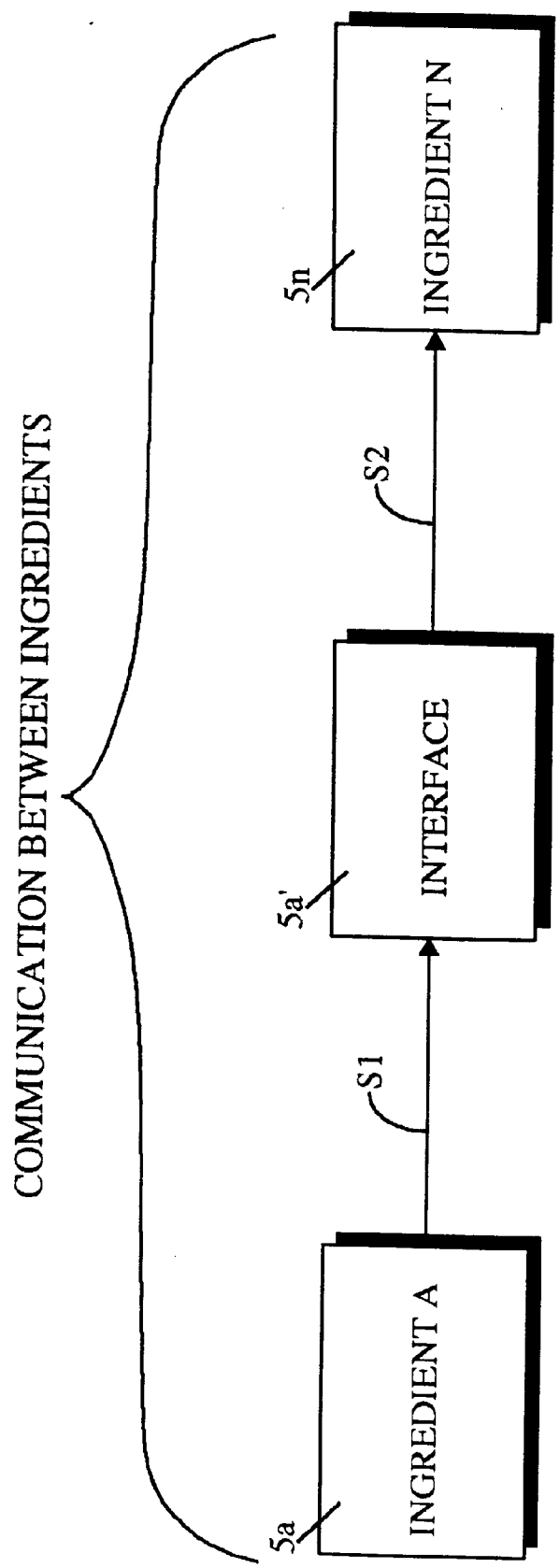
FIG. 1b is a block diagram of first and second ingredients communicating according to the present invention.

FIG. 1b is a block diagram of an ingredient 5a communicating with another ingredient 5n through an interface 5a', according to the present invention, which establishes a trust boundary. As will be discussed in greater detail with respect to FIG. 1c below, interface 5a' can be either a presence interface or an unum interface, according to the present invention. If ingredients 5a and 5n are within the same unum but within different presences, interface 5a' will be a presence interface. If ingredients 5a and 5n are within different unums but within the same agency, interface 5a' will be an unum interface. In summary and as shown in FIG. 1b, a message from an ingredient 5n, for example, to an ingredient 5a, for example, is actually transmitted to interface 5a' and then dispatched to ingredient 5n, as will be discussed in detail below. Interfaces 5a and 5k are explicit interfaces within a presence trust boundaries.

Distributed Instantiation Communication Methods

Figure 1C:
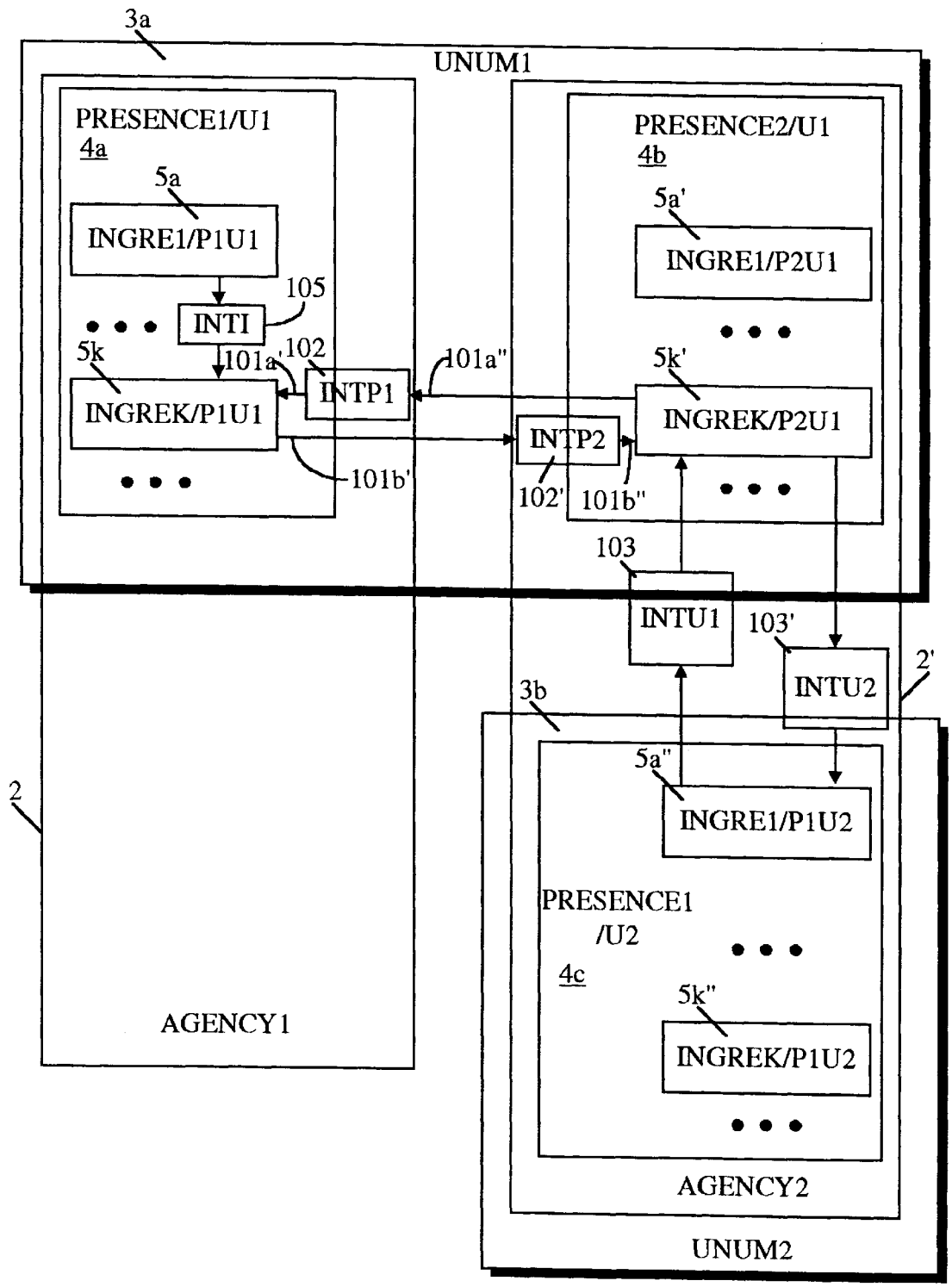
FIG. 1c is a block diagram of communication modes between first and second unums, between first and second ingredients, between an ingredient and a presence, and between an unum and a ingredient, both being on the same presence, according to the present invention.

FIG. 1c shows a distributed instantiation system according to the present invention. The system, accordingly to one embodiment, includes UNUM1, 3a, and UNUM2, 3b. UNUM1 is resident on first and second agencies, respectively 2 and 2' (i.e., AGENCY1 and AGENCY2). UNUM2 is resident on second agency 2'. Agencies 2 and 2' include data processing machines at separate physical locations. The presence of UNUM1 on AGENCY1 is presence 4a (i.e., PRESENCE 1/U1). Presence 4a includes a plurality of ingredients 5a through 5n including ingredient 5k, and presence interface 102 (i.e., INTP1). Presence 4b includes a plurality of ingredients 5a' through 5n', including ingredient 5k', and presence interface 102' (i.e., INTP2). Presence 4c includes a plurality of ingredients, 5a" through 5n", including ingredient 5k".

UNUM1 includes unum interface 103 (i.e., INTU1). UNUM2 includes unum interface 103' (i.e., INTU2). Accordingly, an ingredient of PRESENCE1/U1 such as INGREK/P1U1 (i.e., ingredient 5k) can communicate a message to an ingredient for PRESENCE2/U1 such as INGREK/P2U1 (i.e., ingredient 5k') by sending a message 101b' conforming to presence interface 102'. The message is routed to its destination, ingredient 5k' by presence interface 102' (INTP2). Further, an ingredient of PRESENCE 2/U1 such as INGREK/P2U1' (i.e., ingredient 5k') can communicate a message to an ingredient of PRESENCE1/U2 such as INGRE1/P1U2 (i.e., ingredient 5a") by sending a message conforming to unum interface 103' (i.e., INTU2). The message is routed to its destination, ingredient 5a" by unum interface 103'.

As a consequence of unum system visibility rules (i.e., trust boundaries), and as shown in FIG. 1c, an ingredient 5a may send a message directly to another ingredient 5k in the same presence, i.e., presence 4a (PRESENCE1/U1) through an ingredient interface, to another presence 4b in unum 3a through a presence interface, or to other unums through an unum interface. Communication between unums 3a and 3b is within a single agency. Communication between presences and agencies, e.g., 4a and 4b, is within a single unum, unum 3a, for example.

According to FIG. 1c, ingredients under the present invention are able to communicate with other ingredients within a presence. Such ingredient to ingredient communication through an ingredient interface 105 is shown in FIG. 1c between ingredients 5a and 5k, which ingredients are both within presence 4a. Thus, communication from one ingredient to other ingredients can be accomplished within the same presence. Additionally, communication to other ingredients can be accomplished across an unum boundary. Such communication across unum boundaries is shown in FIG. 1c, according to the example of ingredient 5k' communicating with unum 3b (i.e., UNUM2) via unum interface 103'.

Further according to the present invention as shown in FIG. 1c, an ingredient can communicate directly with a presence other than its own, within the same unum. For example, ingredient 5k' is shown in communication along paths 101a" and 101a' to ingredient 5k.

Further according to the present invention as shown in FIG. 1c, an ingredient can communicate directly with another unum within an agency. Such intra-agency communication across unum boundaries is shown in FIG. 1c, according to the example of ingredient 5k' communicating with unum 3b (i.e. UNUM2).

Distributed Instantiation System Composition

Figure 2:
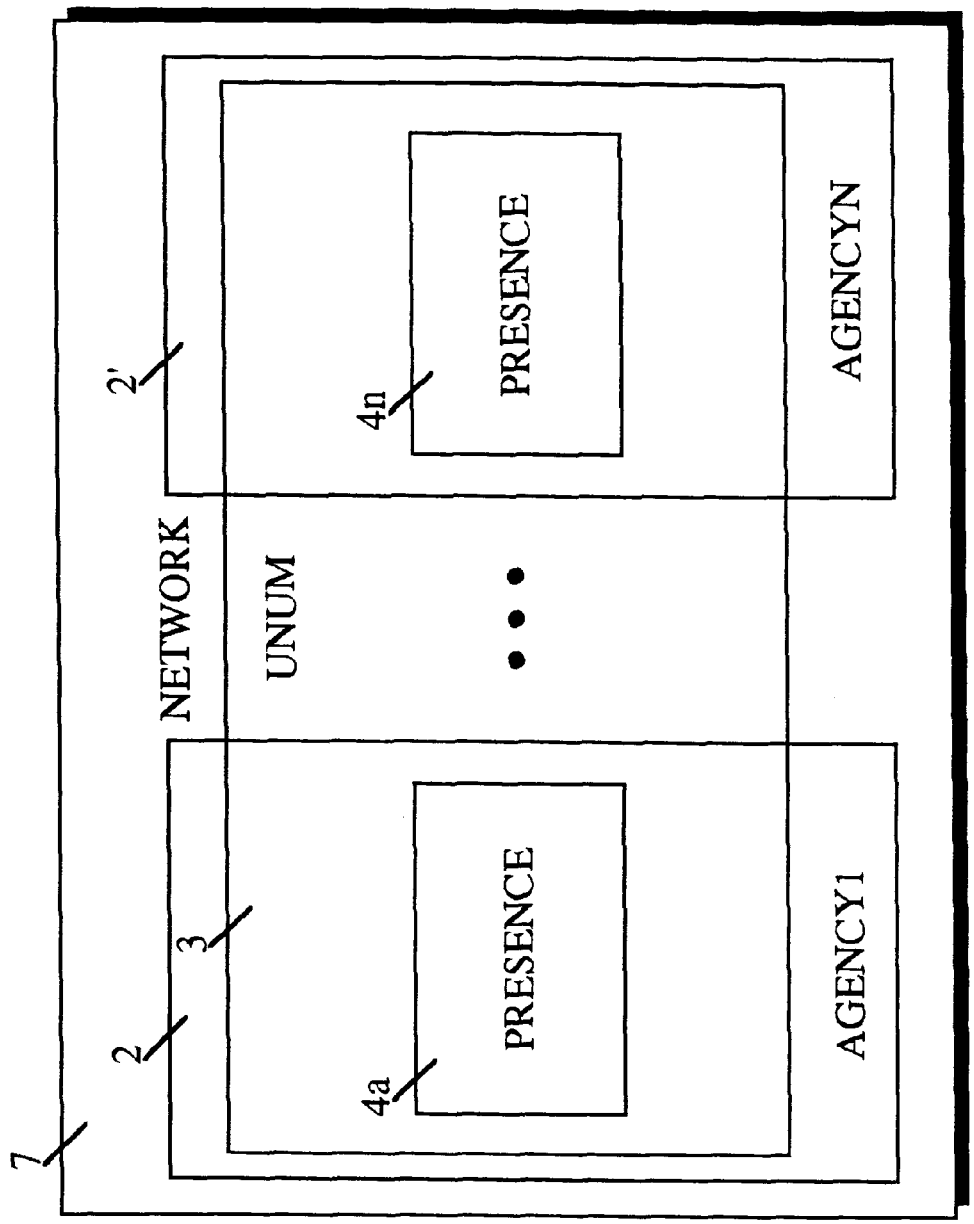
FIG. 2 is a block diagram of a network including an unum according to the present invention and including a selected number of presences.

FIG. 2 is a block diagram of a network 7 including an unum 3 according to the present invention and including a selected number of presences 4a–4n. Presence 4a is shown encapsulated within a first agency (i.e., machine) 2, and presence 4n is shown encapsulated within a second agency 2'.

Pluribus is a tool according to the present invention which generates unums according to the present invention, and generates the descriptive information which tells the agency how to route messages and to define interfaces. The preceding paragraphs describe unums et al., 3, as runtime entities. However, there is an additional dimension of description which concerns how an unum 3 is defined and created in the first place.

Ingredient Composition

Figure 3A:
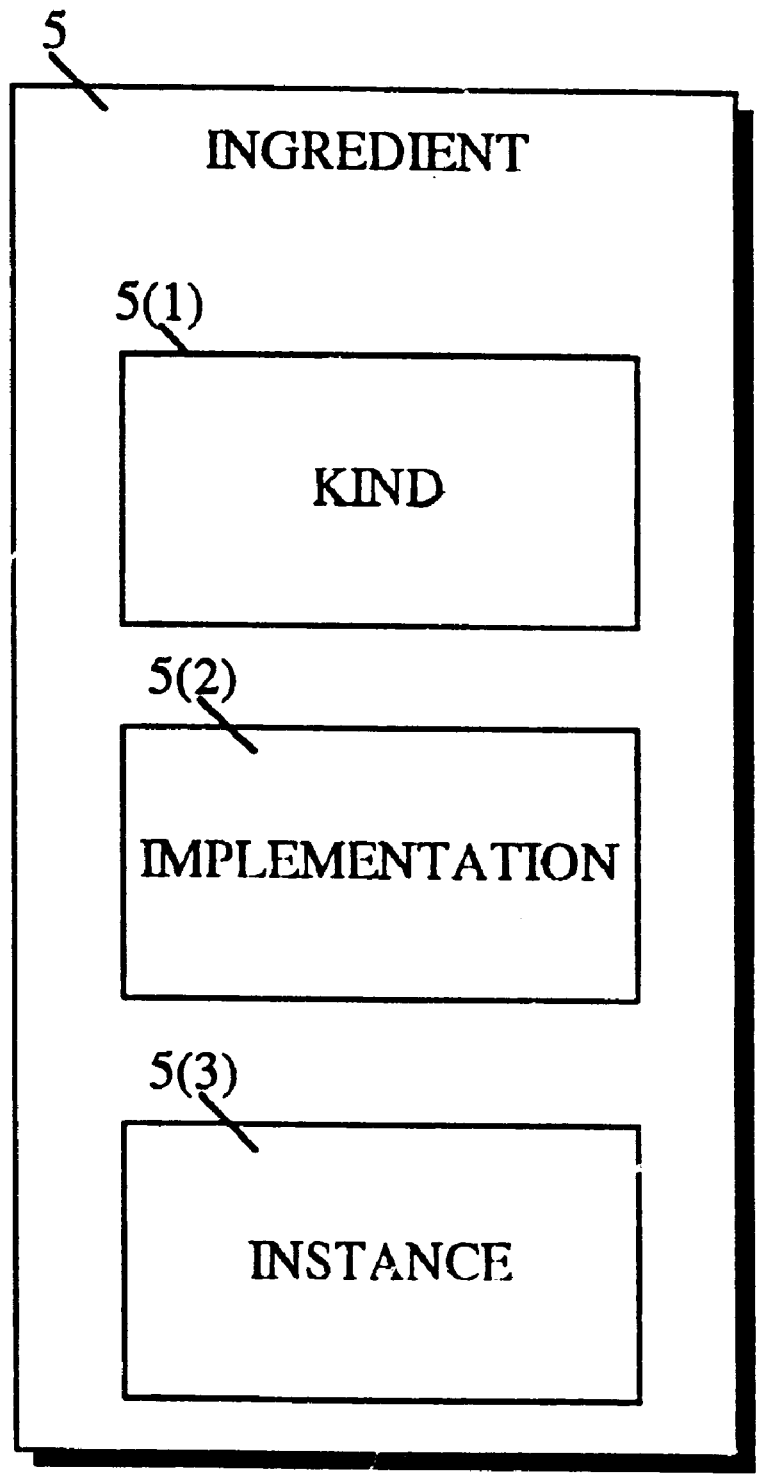
FIG. 3a is block diagram of an ingredient according to the present invention including kind, implementation, and attribute features.

FIG. 3a is diagram of an ingredient according to the present invention including kind, implementation, and attribute features. Ingredient 5 includes three levels of particularity: kind 5(1), implementation 5(2), and instance 5(3). First, an ingredient has a kind 5(1), which corresponds to type or class and encapsulates the notion of substitutability. A kind of ingredient 5 is replaceable with ingredients of like kind without essentially altering the nature of the presence 4 in which the ingredient is embedded.

Ingredient and Elements

Figure 3B:
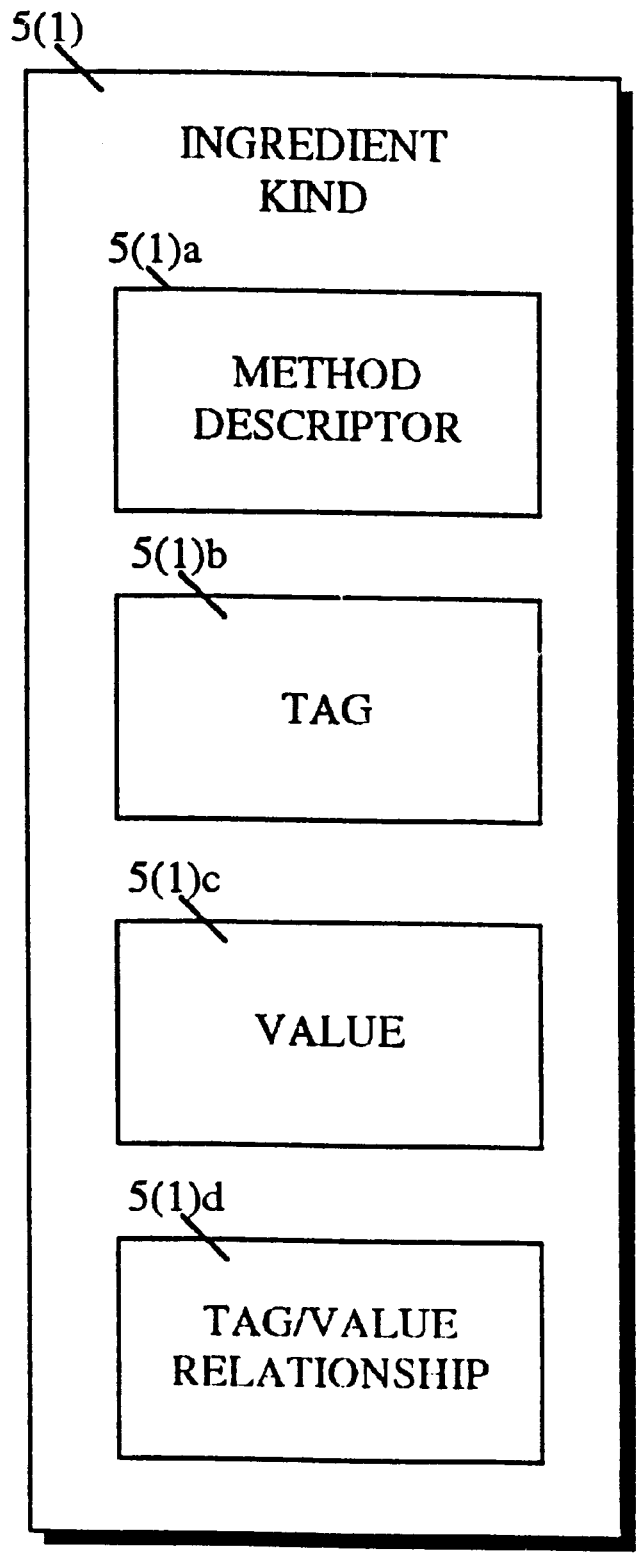
FIG. 3b is an block diagram of an ingredient kind according to the present invention including method descriptor, tag, value, and tag\value relationship.

As shown in FIG. 3b, an ingredient kind 5(1) describes the behavioral contract to which an ingredient is bound, including methods 5(1)a (and number and type of argument and 5(1)b return value 5(1)c) and their capabilities. An ingredient kind consists of a type or class or interface descriptor in a common or traditional sense, plus additional description including, at least, version and certification information.

Ingredient Implementation

Figure 3C:
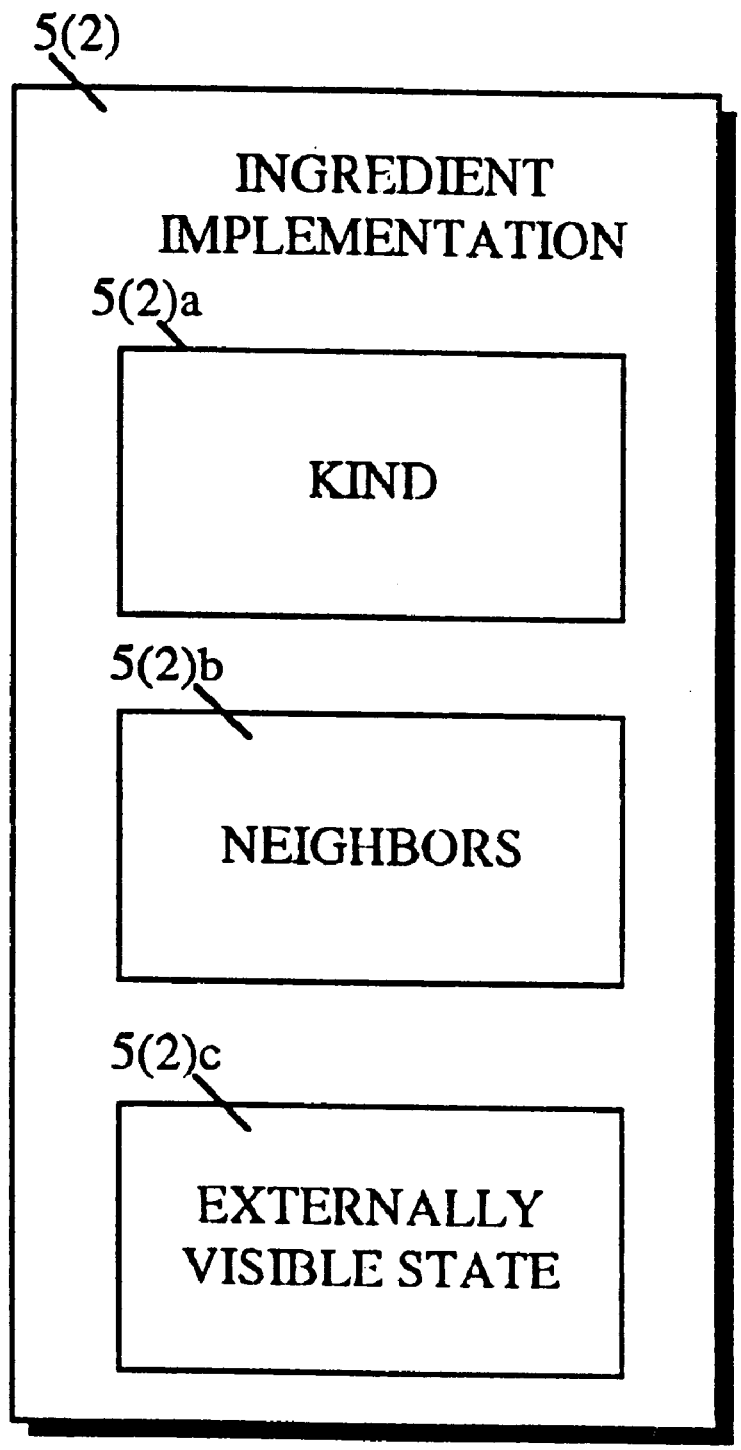
FIG. 3c is an block diagram of an ingredient implementation according to the present invention including kind, neighbors, and externally visible state.

The second level of ingredient particularity is called implementation, 5(2), as shown in FIG. 3c. Implementation encapsulates the notion of instantiability—an ingredient may be instantiated once it has an implementation. An ingredient's implementation is constrained by its kind 5(2)a; that is, the implementation must conform to the specification given by ingredient kind. However, this still leaves latitude for variation. An ingredient implementation includes the actual bits and bytes which constitute the implementation proper, plus descriptive attributes which constrain the environment in which the implementation may be used. Such attributes include platform (e.g., Macintosh or Windows) and standard (e.g., JPEG or GIF), as well as others which peculiar to ingredient purpose. For example, an ingredient containing an image designed to be an avatar head might have a "head" attribute indicating this; another ingredient which wished to use the image to display an avatar head would require it to have this attribute, though other ingredients that use images but are unconcerned with "headness" would ignore the head attribute. Note that implementation goes beyond the brand of machine accommodating an ingredient. Different static data objects of a single ingredient kind are typically different implementations of that kind: an image depicting a house, a second depicting a car and a third depicting an avatar would be three different implementations of image. The third level of ingredient particularity is called instance 5(3). Instance encapsulates the notions of identity and existence. Instances may be sent messages and may be state mutable, requiring an instance to be individual and separate from other instances of the same kind and implementation. Instances may be state immutable, defined by the environment and parameters of creation. An ingredient knows to what unum it belongs. With static data, the distinction between particular implementation and necessarily immutable state is not automatic. The programmer decides based on whether or not a particular chunk of information is unique or ephemeral. Returning to the image example from the previous paragraph, one could treat the pixels of an image as immutable state data, but this would be awkward and would preclude using the same image in other ways (unless you actually copy the pixels). If an ingredient wishes to contain an image like this, it would be far better for its immutable state merely to contain a reference to a separate image ingredient.

Ingredient Complication #1: Important among the attributes that an ingredient implementation may possess are neighbor specifications 5(2)b. These are ingredient kind and presence kind specifications for other ingredients in the presence and other presences in the unum in which the ingredient is to be instantiated. This is how an implementation describes its expectations of the other ingredients and presences to which it expects to send messages. Each such ingredient or presence is labeled. The association between an ingredient's labels for its neighbors and the actual neighbors themselves is given in the presence's structure description (discussed below).

Ingredient Complication #2: The state 5(2)c (mutable or immutable) of an ingredient may be shared with other ingredients in other presences of the same unum. Since it is not desirable to enforce a one-to-one correspondence between ingredients across an agency boundary, it is needed to at least draw a correspondence between state variables. An ingredient implementation may declare, among its attributes, one or more named state bundles. These are groups of state variables that are to be shared between presences. When a new presence is created on another agency, the values of these variables are sent to initialize the state of the newly created ingredient instances. The presences of a given unum must agree on the labels of these state bundles (in order to know what values go with what ingredients), so a presence's structure description (see below) must contain a mapping between an ingredient's labels for its state bundles and the labels that the presence is going to use.

Ingredient Instance Composition

Figure 3D:
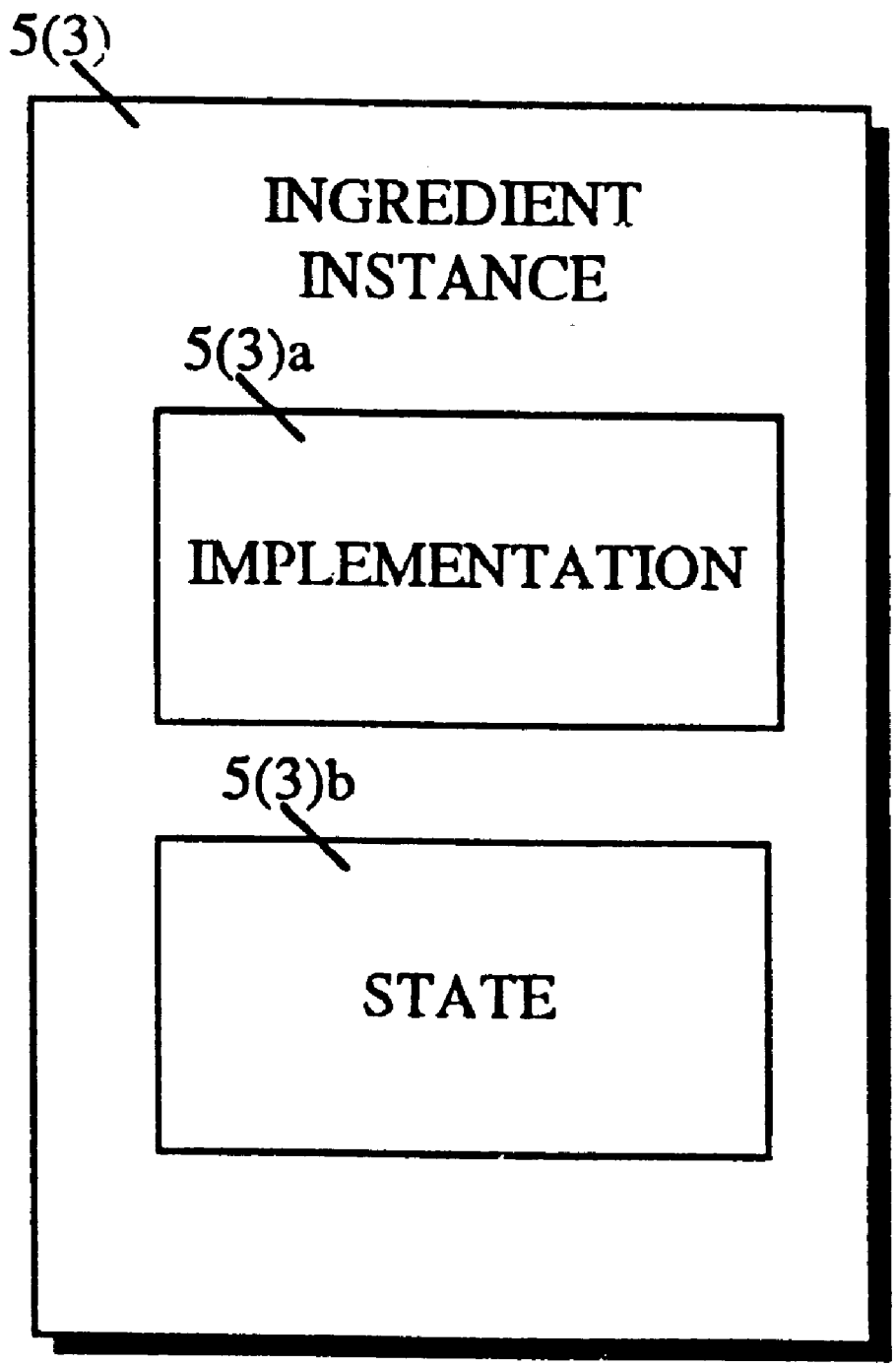
FIG. 3d is an block diagram of an ingredient instance according to the present invention including implementation and state.

FIG. 3d is a block diagram of an ingredient instance 5(3), according to the present invention, including implementation 5(3)a and state 5(3)b.

Presence Composition

Figure 4A:
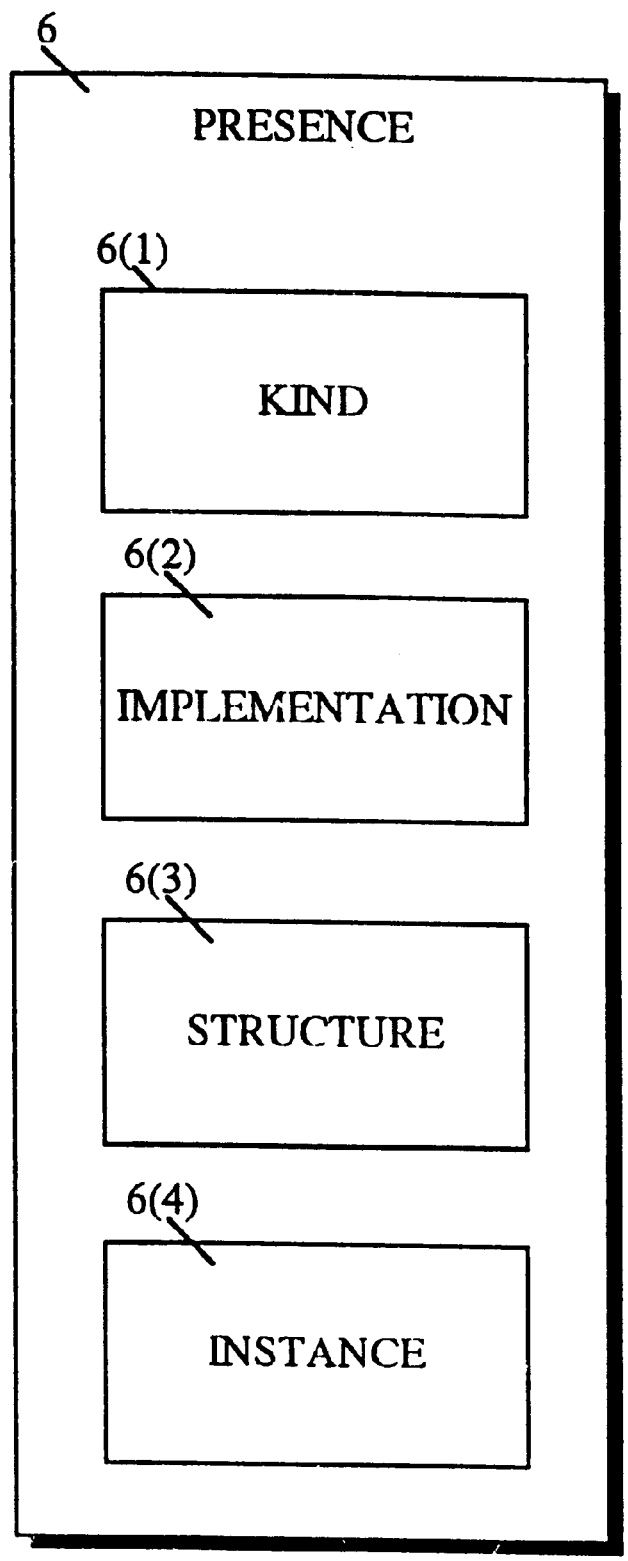
FIG. 4a is a block diagram of presence according to the present invention including kind, implementation, structure, and attribute features.

FIG. 4a is a presence 6 according to the present invention including kind, implementation, structure, and attribute features, respectively 6(1)–6(4). A presence 6 can be described at four levels of particularity. Presences have some relation to the three levels of ingredient particularity, but the partition is slightly different. As with ingredients, the first level is called kind, with a directly analogous meaning: it encapsulates the notion of substitutability, but this time at the presence level.

Presence Kinds

Figure 4B:
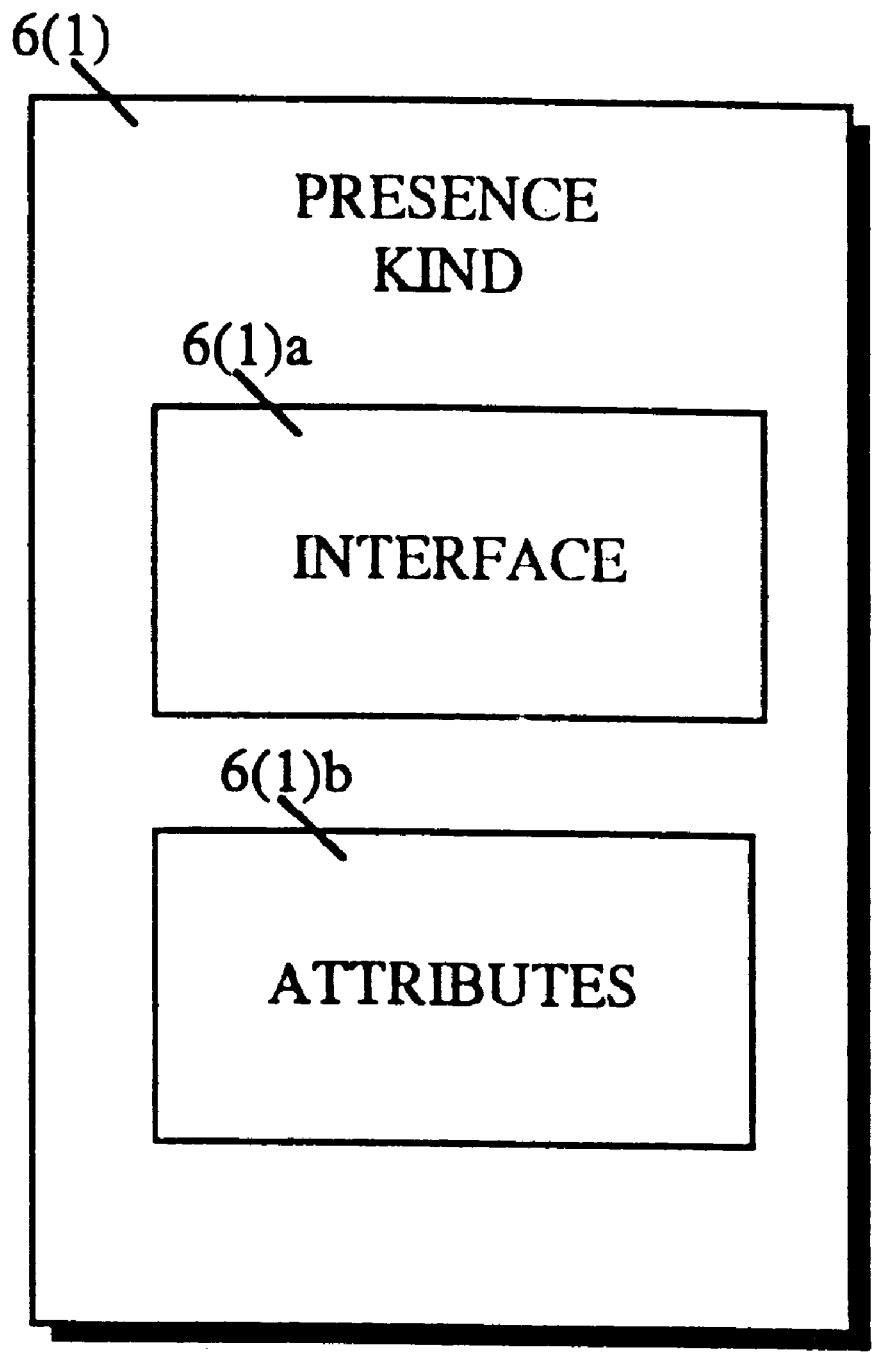
FIG. 4b is a block diagram of presence kind according to the present invention including interface and attributes.

As shown in FIG. 4b, a presence kind 6(1) describes the behavioral contract to which the presence is bound, in the form of an interface descriptor 6(1)a plus additional descriptive attributes 6(1)b. Note one important distinction between an ingredient kind and a presence kind: an ingredient is intended to be generic, in the sense that a given kind of ingredient may, in principle at least, be used in any number of different kinds of unums. Presence kinds 6(1), on the other hand, tend to be intimately associated with the kind of unums in which they will be used: e.g., the client presence of a rock unum knows that it is a rock that it is the client of.

Presence Implementation

Figure 4C:
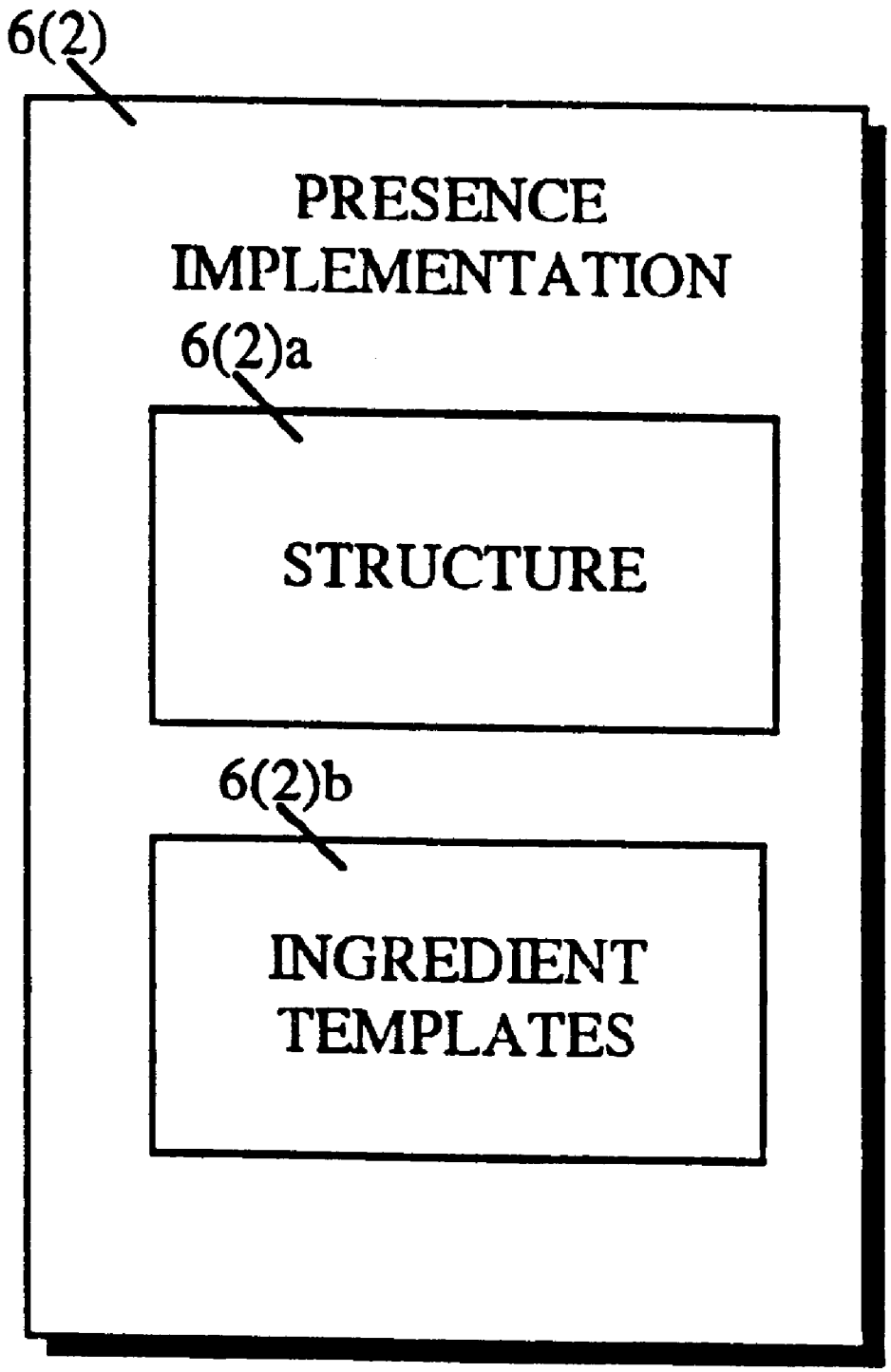
FIG. 4c is a block diagram of presence implementation according to the present invention including structure and ingredient templates.

The third level of presence particularity as shown in FIG. 4c, is implementation 6(2) and is related to the implementation level of ingredient particularity: it too encapsulates the notion of instantiability. A presence implementation selects a particular ingredient implementation for each role in the presence structure 6(2)a. The presence implementation also contains three additional sorts of information. The first is a role name mapping for each ingredient implementation, associating the names that the ingredient implementation designated for its neighbor ingredients and the roles described by the presence structure. The second is a state bundle name mapping for each ingredient implementation, associating the names that the ingredient implementation designated for its state bundles and the names that the presence will use for those state bundles when communicating with other presences. The third is a set of configuration parameters for the immutable states of the various ingredients (i.e., the arguments to the ingredient constructor functions).

The fourth level of presence particularity is instance 6(4) and, as you would expect, encapsulates identity and existence. However, unlike an ingredient instance, a presence instance is epiphenomenal: all that really exists are the individual ingredient instances (actually, there may be some data structure maintained by the agency so it can take messages that are addressed to the presence and route them to ingredients, but this routing information is not necessarily a separate object and in any case is not visible to the ingredients themselves).

Presence Structure

Figure 4D:
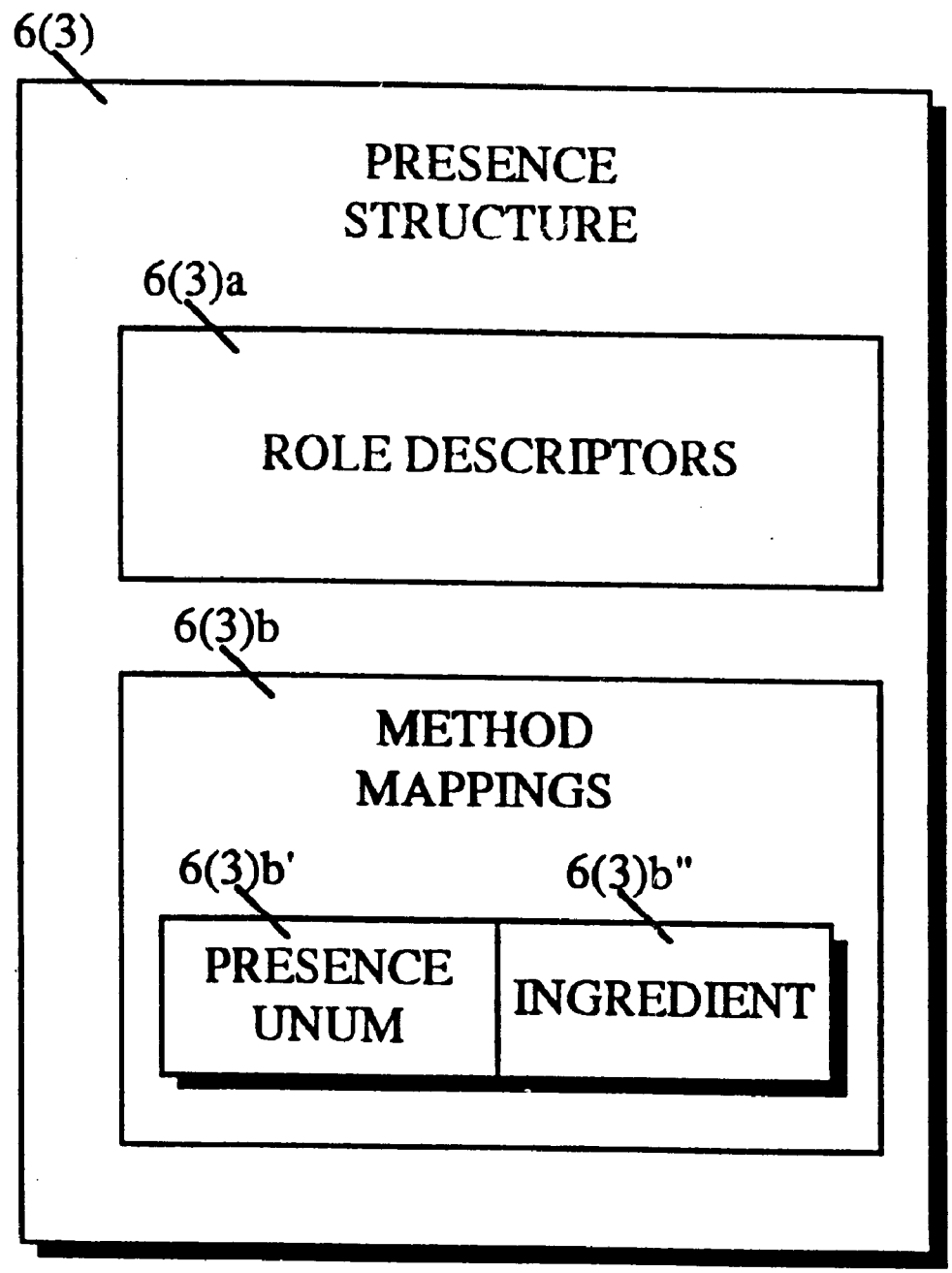
FIG. 4d is a block diagram of presence structure according to the present invention including role descriptors and method mappings.

As shown in FIG. 4d, the second level of presence particularity is called structure 6(3). Structure encapsulates the notion of plumbing. A presence structure describes the composition of a presence in terms of ingredients. More specifically, it describes the composition in terms of ingredient kinds. Each ingredient in the presence is assigned a role 6(3)a, which is simply a label that serves to identify that ingredient relative to the presence as a whole. In addition, a presence structure contains a method mapping 6(3)b relating the methods specified in the presence kind (and unum kind, as will be discussed below) to particular methods of component ingredients, enabling the ingredients to collectively realize the presence interface (and unum interface).

Unum Composition

Figure 5A:
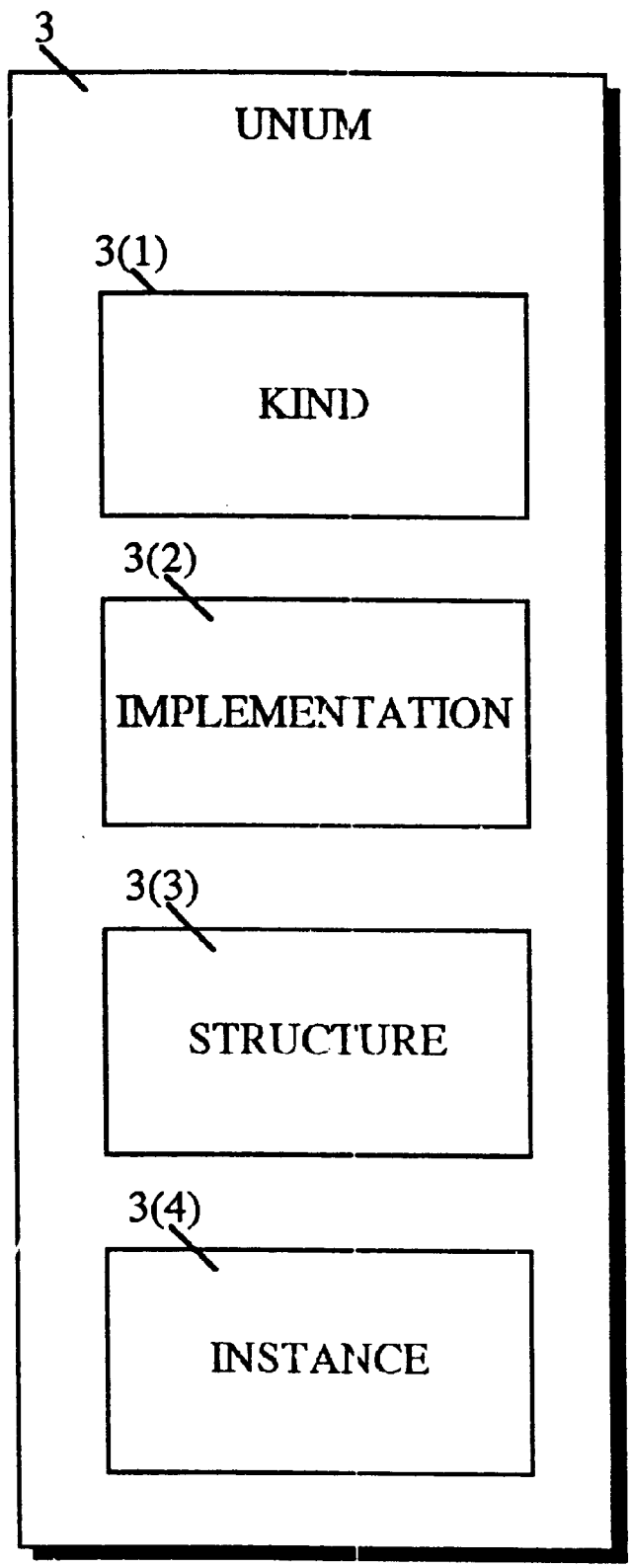
FIG. 5a is an unum according to the present invention including kind, implementation, structure, and attribute features.

FIG. 5a is an unum 3 according to the present invention including kind, implementation, structure, and attribute features, respectively 3(1)–3(4). An Unum 3 can be described at three levels of particularity, which are direct counterparts of the identically named levels in the ingredient and presence descriptions.

Unum Kind

Figure 5B:
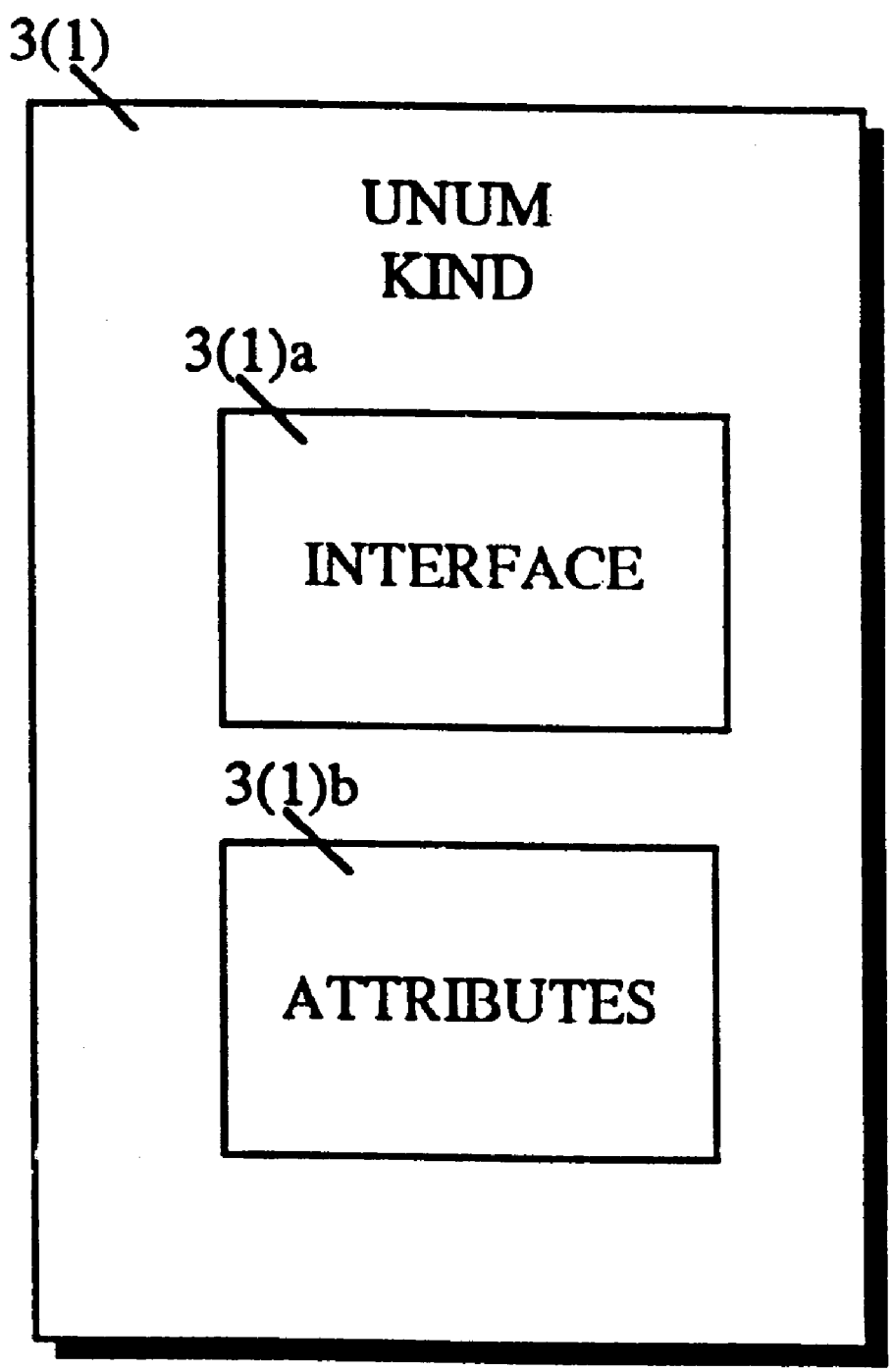
FIG. 5b is a block diagram of an unum according to the present invention including interface and attribute features.

In particular, the first level of unum 3 particularity we call kind 3(1), again encapsulating the notion of substitutability. As shown in FIG. 5b, an unum kind 3(1) describes the behavioral contract to which the unum is bound, in the form of an interface descriptor 3(1)a plus additional descriptive attributes 3(1)b.

Unum Implementation

Figure 5C:
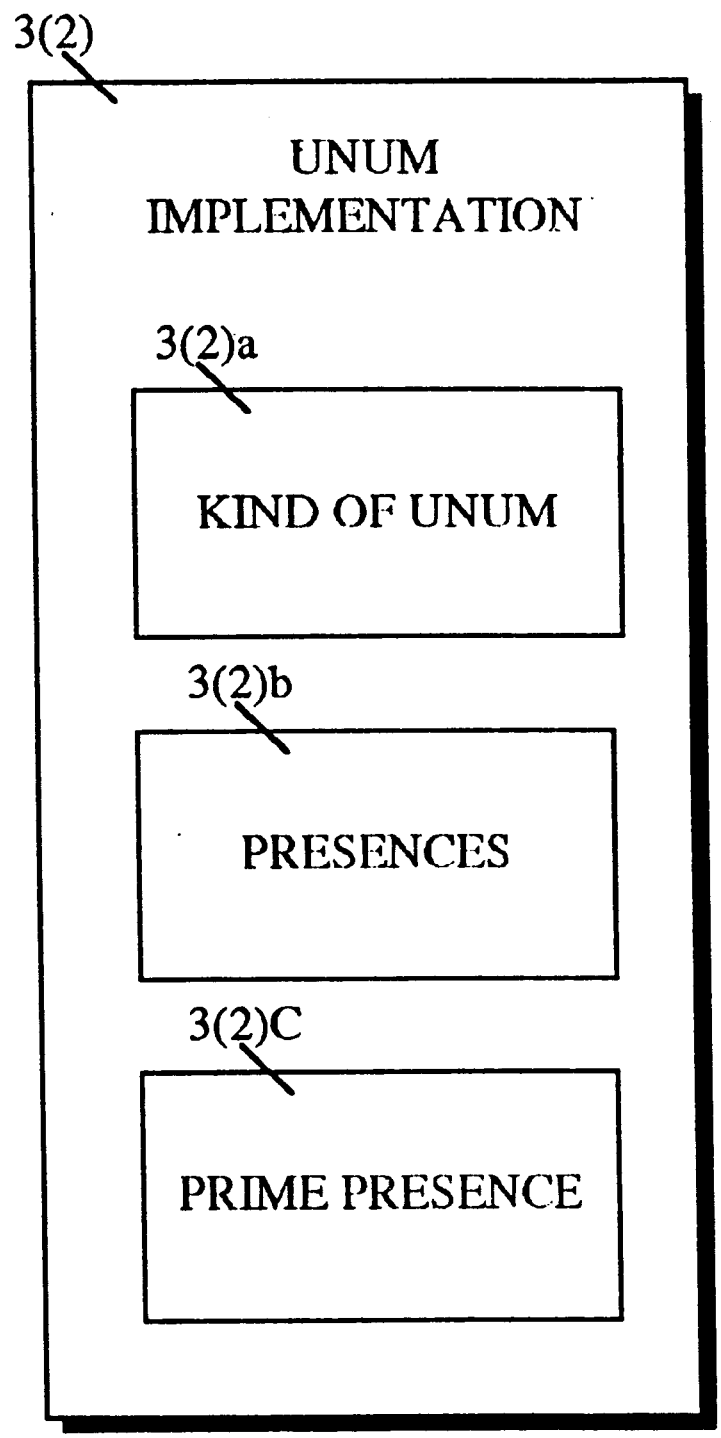
FIG. 5c is a block diagram of an unum implementation according to the present invention including kind of unum, presences, and prime presence features.

As shown in FIG. 5c, the second level of unum particularity is implementation 3(2), encapsulating the notion instantiability. In the description of an unum, however, this is much simpler than it is in the description of a presence or an ingredient. An unum implementation is simply a list of presence implementations, one of which is designated as the prime presence. The prime presence's sole distinction from the other presences is that it is the first to be instantiated when a new unum is created. Indeed, creating a new unum consists of nothing else but instantiating the prime presence. Note that unums as such are never really instantiated—presences are.

Note an important corollary of this: in order to instantiate a presence, you need a complete presence description at the implementation level, which in turn implies that you need complete implementations for all the ingredients incorporated by that presence. However, to instantiate an unum, all that is required is the presence description for whatever kind of presence should be created locally. The remainder of the unum description is not needed. In many cases, the descriptions of presences (and ingredients) other than your own may be deliberately withheld for security reasons.

Unum Structure

The third level of unum 3 particularity, is structure 3(3).

Unum Instance Composition

Figure 5D:
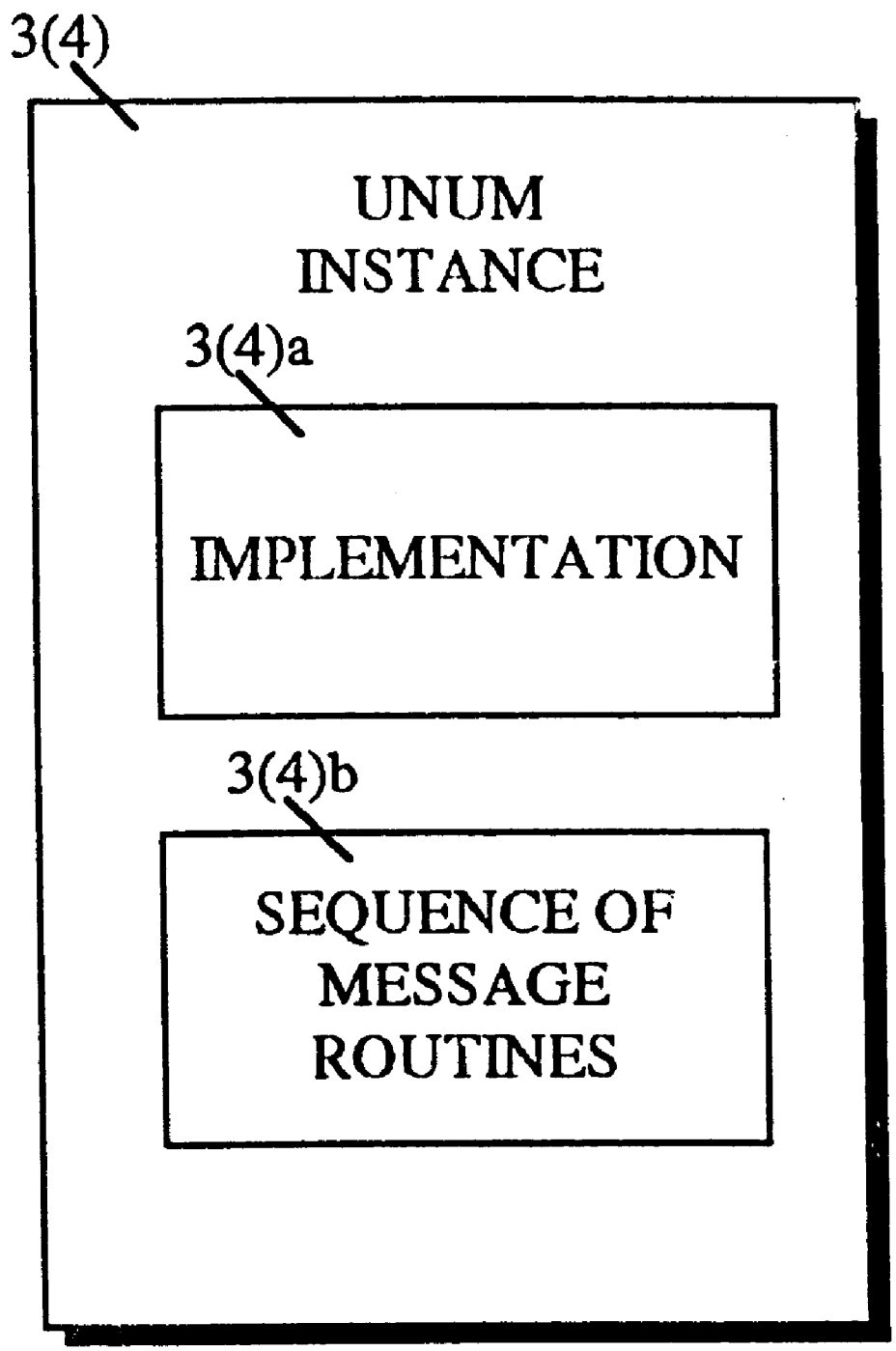
FIG. 5d is a block diagram of an unum instance according to the present invention including implementation and sequence of message routings.

As shown in FIG. 5d, the fourth level of unum 3 particularity is instance 3(4), encapsulating identity and existence, and including implementation 3(4)a and a sequence of message routines 3(4)b. As with presences, an unum instance is epiphenomenal—perhaps more so given that the constituent elements are themselves epiphenomenal.

FIG. 5b is a block diagram of unum 3 according to the present invention including interface 3(1)a and attribute 3(1)b features. The presences 4 and ingredients 5 which compose an unum 3 are not visible external to the unum 3; that is, ingredients 5 in one unum 3 see other unums 3 as singular, indivisible entities. Similarly, the ingredients 5 which compose a presence 4 are not visible external to the presence; that is, ingredients 5 in a presence 4 see the other presences 4 as singular, indivisible entities. Ingredients 5 interact by sending messages to one another, according to one embodiment.

The Pluribus compiler as described below takes a Pluribus compilation unit (such as a series of Pluribus statements in a file) as input and produces a variety of objects according to the present invention (called resources) in a cyberspace agency database as its output including Unums, presences, and ingredients. The preceding discussion leads us to the following object catalog which represents the resources that Pluribus will generate. CORBA IDL syntax is used to describe two types of resources which will be dealt with later: the typeDescriptor, which represents the encoding of a CORBA type definition, and symbol, which represents a symbolic identifier.

An ingredient kind 5(1) as shown in FIG. 3a includes an interface and other attributes:

```
struct ingredientKind {
    interfaceDescriptor ingredientInterface;
    sequence<attribute> otherAttributes;
}
```

We have a special type for the interface descriptor 5(1)a, used repeatedly, in the form of a sequence of method descriptors:

typedef sequence<methodDescriptor> interfaceDescriptor;

Method descriptors in turn consist of an opcode symbol and a sequence of parameters as follows:

```
struct methodDescriptor {
    symbol op;
    sequence<typeDescriptor> parameters;
}
```

FIG. 3b shows ingredient kind 5(1) may additionally be qualified with zero or more other attributes, a tag 5(1)b, a value 5(1)c, and a relationship 5(1)c between the tag and the value:

```
struct attribute {
    symbol label;
    relationCode relation;
    any value;
}
enum relationCode {
    rel__lessThan,
    rel__lessThanOrEqual,
    rel__greaterThan,
    rel__greaterThanOrEqual,
    rel__equal,
    rel__notEqual,
    rel__present,
    rel__notPresent,
    rel__is,
    rel__isNot
}
```

An ingredient implementation 5(2) is required to express what kind 5(2)a of ingredient it is, what kind of neighbors 5(2)b it requires, what externally visible state 5(2)c it maintains, and other attributes. The latter are the same sorts of things as can be attached to ingredient kinds (though the particular attributes that will actually be used will be different). And, of course, it has to have the implementation itself-the actual executable methods, data blocks, and so on:

```
struct ingredientImplementation {
    ingredientKind kind;
    sequence<neighborDescriptor> neighborRequirements;
    sequence<stateBundleDescriptor> stateBundles;
    sequence<attribute> otherAttributes;
    sequence<method> methods;
    sequence<dataBlock> data;
}
```

The implementation 5(2) further declares what kinds of neighbors 5(2)b it requires with a sequence of neighbor descriptors, each of which consists of a symbolic label (which is the name that the ingredient will use internally to refer to that neighbor) and what kind of ingredient the neighbor is expected to be:

```
struct neighborDescriptor {
    symbol label;
    ingredientKind requirement;
}
```

Each of the state bundles that the ingredient implementation manages has a state bundle descriptor, consisting of a symbolic label for the bundle and a state variable struct:

```
struct stateBundleDescriptor {
    symbol label;
    structDescriptor stateVars;
}
```

The state variable struct descriptor is simply a sequence of variable descriptors:

typedef sequence<variable>structDescriptor;

each of which is a symbolic name and an associated type:

```
struct variable {
    symbol var;
    typeDescriptor type;
}
```

Each of the methods is described by:

```
struct method {
    methodDescriptor interface;
    any code;
}
```

Each of the data blocks is described by:

```
struct dataBlock {
    int length;
    sequence<octet> data;
}
```

An ingredient instance 5(3) knows what implementation 5(3)a it is an instance of, and it has whatever state 5(3)b it should have:

```
struct ingredientInstance {
    ingredientImplementation implementation;
    any state;
}
```

As shown in FIG. 4b, a presence kind 6(1) consists of an interface 6(1)a and other attributes 6(1)b:

```
struct presenceKind {
    interfaceDescriptor presenceInterface;
    sequence<attribute> otherAttributes;
}
```

A presence structure 6(3) as shown in FIG. 4d knows what kind of presence it is a structure for. It also contains a sequence of role descriptors 6(3)a which specify the ingredients it is made from, and the mappings 6(3)b of presence and unum methods 6(3)b' to ingredient methods 6(3)b":

```
struct presenceStructure {
    presenceKind kind;
    sequence<roleDescriptor> ingredients;
    sequence<deliveryMapping> presenceDeliveryMapping;
    sequence<deliveryMapping> unumDeliveryMapping;
    sequence<attribute> otherAttributes;
}
```

A presence role descriptor 6(3)a specifies a particular ingredient for a particular role in the presence. It contains a symbolic name for the role and the kind of ingredient which is expect to fill that role:

```
struct roleDescriptor {
    symbol roleName;
    ingredientKind ingredient;
}
```

Both presence methods and unum methods are mappings to ingredient methods with method delivery mappings, giving a method to map from and a role (i.e., ingredient) and method to map to:

```
struct deliveryMapping {
    symbol fromMethod;
    symbol toRole;
    symbol toMethod;
}
```

A presence implementation 6(2) is associated with a presence structure 6(2)a and a sequence of templates 6(2)b which describe the ingredients to be instantiated:

```
struct presenceImplementation {
    presenceStructure structure;
    sequence<ingredientTemplate> ingredients;
    sequence<attribute> otherAttributes;
}
```

An ingredient template 6(2)b is probably the most complicated of the objects described in this section. It consists of a sequence of role identifiers, indicating the roles the ingredient is expecting to fulfill, an ingredient implementation to instantiate, mappings from the ingredient's names for its neighbor roles and state bundles to the presence's names for those roles and state bundles, and configuration parameters to instantiate the ingredient with:

```
struct ingredientTemplate {
    sequence<symbol> roles;
    ingredientImplementation ingredient;
    sequence<nameMapping> neighborRoleMapping;
    sequence<nameMapping> stateBundleNameMapping;
    sequence<any> configurationParameters;
    sequence<stateInit> stateBundleConfigurationParamet
}
```

Neighbor role and state bundle names are mapped with a name mapping, giving a name to map from and one to map to:

```
struct nameMapping {
    symbol from;
    symbol to;
}
```

State bundles are initialized by:

```
struct stateInit {
    symbol bundle;
    sequence<stateVarInit> inits;
}
struct stateVarInit {
    symbol var;
    any initValue;
}
```

A presence instance, at runtime, needs to know what presence it is implementing and it needs to be able to route messages that are sent to the presence on to particular ingredients in the presence instance:

```
struct presenceInstance {
    presenceImplementation implementation;
    sequence<messageRouting> presenceInterfaceRouting;
}
```

Messages are routed simply by indicating which messages go to which ingredient:

```
struct messageRouting {
    sequence<symbol> messages;
    ingredientInstance recipient;
}
```

As shown in FIG. 5b, an unum kind 3(1) consists of an interface 3(1)a and other attributes 3(1)b:

```
struct unumKind {
    interfaceDescriptor unumInterface;
    sequence<attribute> otherAttributes;
}
```

As shown in FIG. 5c, an unum implementation 3(2) is described by stating the unum kind 3(2)a, and giving the presences 3(2)b it is made up of, with the prime presence distinguished 3(2)c:

```
struct unumImplementation {
    unumKind kind;
    presenceImplementation primePresence;
    sequence<presenceImplementation> presences;
    sequence<attribute> otherAttributes;
}
```

As shown in FIG. 5d, an unum instance 3(4), like a presence instance, consists of an unum implementation 3(4)a and a sequence of message routings 3(4)b:

```
struct unumInstance {
    unumImplementation implementation;
    sequence<messageRouting> unumInterfaceRouting;
}
```

The Pluribus input language enables the user to describe the various entities defined in the previous section. This section describes the language itself. The syntax of the language is C-like. In particular, the lexical rules are the same as C's. Below are explained some generally applicable syntactic and lexical principles, then describe the statements of the language themselves.

In the grammar that follows, courier is used to indicate literal keywords and punctuation, italics are used to indicate meta-syntactic variables. French quotation marks ("") are used to indicate optional elements. An optional element followed by a superscripted asterisk ("*") indicates zero or more repetitions of the element, while a superscripted plus ("+") indicates one or more repetitions.

Names in Pluribus are ordinary symbolic identifiers. They follow the same lexical rules as identifiers in C: a sequence of one or more alphanumeric characters, the first of which must be a letter. Case is significant. The underscore character ("_") is an honorary letter; unlike Java, however, the dollar sign character ("$") is not.

Numbers in Pluribus are integers (Pluribus itself has no need for floating point numbers; ingredient implementations may, but their code is outside the scope of Pluribus' syntax). These numbers follow the same lexical rules as C: a decimal number consists of one or more decimal digits; an octal number consists of a "0" followed by one or more octal digits; a hexadecimal number consists of "0x" or "0X" followed by one or more hexadecimal digits (case unimportant). Character constants are treated as numbers, again, just like C. A character constant is one or more characters enclosed in apostrophes ("'"). The standard repertoire of ANSI C escape sequences ("\" followed by a character) is recognized. Multiple-character character constants are allowed, up to the precision of Pluribus' integers (i.e., 4 characters).

Strings in Pluribus consist of any number of characters between quotation marks ("""), with, once again, the usual "\" escapes recognized.

Both C and C++ style comments are recognized: anything between "/*" and "*/" is a comment, as is anything between "//" and a newline. Comments are treated as whitespace. Whitespace, in general, can be used freely for formatting.

In any circumstance where a numeric value is required, Pluribus also allows simple arithmetic expressions. An expression is any of the following:

number
expression * expression
expression / expression
expression + expression expression − expression
expression & expression
expression | expression
− expression
~ expression
( expression )
specialfunction ( )

where number is a literal number of some sort, the operators all have their usual meanings (and precedences), and specialfunction is the name of a function that is built into Pluribus. The exact set of special functions that will be available remains to be determined, but we want to leave a hook for values which must be computed from information known only to Pluribus internally. Such expressions are evaluated by Pluribus in whatever context they are found.

Most Pluribus statements share a common format, which I will explain once here in order to make clear the overall pattern of the data objects which you define in this language. The typical Pluribus statement comes in three canonical forms. The first canonical form is:

```
Error! Bookmark not defined. keyword name {
    attribute*
}
```

This is called the definition form. It defines one of the various kinds of Pluribus data objects, where keyword is a language keyword that specifies what kind of object is being defined, name is the symbolic name to give to the object being defined and each attribute is an attribute of the object. Precisely which kinds of attributes will be allowed will depend on keyword; some attributes may be mandatory. Each attribute is itself a Pluribus statement in one of the other two forms which will be described next.

The name name may be used anywhere within the containing scoping unit to designate this object. If the keyword extern is given, the name will also be available in the outer scope (see the discussion of modules and scoping below). Note that each kind of Pluribus object establishes a separate namespace; e.g., if you define an unum kind named "foo" and an ingredient implementation named "foo", there is no name collision.

The second canonical form is:

keyword name ;

This is called the invocation form. It is used in the body of an enclosing definition statement to invoke a previously defined Pluribus data object as an attribute of the object being defined, where keyword is a language keyword that specifies what kind of object that is being invoked and name specifies which object of that kind is intended.

The third canonical form is:

```
keyword {
    attribute*
}
```

This is called the anonymous form. It is used in the body of an enclosing definition statement to both define and invoke a nameless Pluribus data object as an attribute of the object being defined, where keyword is a language keyword that specifies the kind of object that is being defined/invoked and each attribute is an attribute of the object. The meaning of the statement and the attributes is the same as for the corresponding definition form, except that no name is defined.

The invocation form and the anonymous form are collectively called attribute forms or simply attributes. The definition form and the anonymous form are collectively called definition forms or simply definitions. Note that the anonymous form really is both a definition form and an attribute form at the same time. In the discussions below, these terms will be used frequently.

Symbolic names created by the various definition forms are lexically scoped. The fundamental scoping construct is the scoping unit, which is described by the unit statement. A scoping unit is a symbolically named package of symbolic names.

The definition form of the unit statement is:

```
unit name {
    statement*
}
``` where name is the symbolic name of the scope unit being defined. Each statement may be any one of the definition forms.

The unit definition statement creates a named lexical scope. All symbols defined inside the scope are not visible outside it, unless they are declared extern (see below). Symbols declared extern are also visible in the immediately enclosing outer scope. Note that a unit may itself be declared extern. A scoping unit which is declared extern may be imported into other scoping units, making any symbols defined in it visible to the importing scope as if they had been defined there originally. Note that an extern unit definition must be the outermost construct in any compilation unit.

The unit statement syntax is canonical. Its invocation form is:

unit name ;

This invocation form has the effect of importing the named scoping unit into the current scope, as just described.

The anonymous form is:

```
unit {
    statement*
}
``` which creates a scoping unit but does not give it a name. This can be used for information hiding and all the other usual things one does with nested scopes in block-structured languages.

Any name defined by a definition form statement within the current scoping unit is visible inside the current scoping unit. Any name defined in any enclosing scoping unit is also visible, but an inner redefinition of a given name hides any outer definition. Names defined in imported scoping unit are visible as if they had been defined in the current scope; that is, an imported name hides the same name from an outer scope. When a name is both defined in the current scope and imported, the defined name hides the imported one. If the same name is found in more than one imported scope, the name cannot be used directly. When you wish to access a name that has been hidden by an import or an inner scope definition, or if you need to distinguish between the same name from different imported scopes, a name reference expression may be used. This takes the form:

scopename . name where scopename is the name of the scope from which the name should be taken, and name is the actual name that you want. Note that scopename may itself be a name reference expression. The outer scope can be referred to by the caret symbol ("^"), so that you do not need to know its name; i.e., ^. name refers to name in the enclosing scope. Carets may be cascaded to access successively more outer scopes, e.g.:

```
^^. name
^^^. name
etc.
```

The outermost enclosing scope is defined by the machine on which we are running. However, names (and thus the objects they designate) may also be imported from scoping units on other machines (assuming, of course, that you have permission to do so). This is accomplished with the statement:

remote scopeURL name ;

where scope URL is a string containing a URL that designates the machine and scope desired and name is the name by which this scope will be known locally.

A locally visible scope can be published for remote import with a statement of the form:

publish name ;

where name is the name of the local scope that is to be made publicly visible over the net.

Each of the statements or attributes described below can be considered as one of the following four types of entity:

A promise states internal conditions that the entity with which it is associated is alleged to satisfy.

A demand states external conditions that must be satisfied for the entity with which it is associated to be valid or useful.

A description states conditions which may be interpreted as either a promise or a demand, depending on context.

An action states things which will be done or information which will be acted on in order to fulfill a promise or assert a demand.

State variables, message parameters and generic attributes are all typed. Such types must be declared before they can be used. Pluribus uses CORBA IDL types and type declaration syntax. The description of this type system is outside the current scope of this document, though it probably should be incorporated eventually. For now, consult the original source: Common Object Request Broker: Architecture and Specification from OMG.

The Generic attribute Statement [description]

Many kinds of Pluribus objects may be tagged with generic descriptive attributes, as discussed above in the Output section. A generic attribute consists of a symbolic label and an optional, typed value. Such attributes must be defined before they may be used. Generic attributes do not follow the canonical syntax described in the previous section. The definition form of a generic attribute statement is:

attribute name Error! Bookmark not defined. ;

where name is the symbolic name of the attribute being created and the type is the data type of its value. If type is omitted the statement defines a tag attribute which takes no value but which can be present or absent. Attribute values may not have composite types.

The invocation form of a generic attribute depends on the context in which it is being used. When it is being used in a generation context, the invocation form is:

attributename Error! Bookmark not defined. ;

where attributename is the name of the attribute being applied and value is its value (unless it is a tag attribute, in which case value is omitted). Alternatively, in such a context an attribute may be defined in use with a statement of the form:

attribute name Error! Bookmark not defined. ;

which is the obvious shorthand for a declaration and use folded into one statement. This is not quite the same thing as an anonymous form, since attributes always have names.

In a descriptive context, the invocation form is:

attributename Error! Bookmark not defined. ;

where attributename is the name of the attribute, value is a value (which, as always, may be omitted in the case of a tag attribute), and relation is an operator that describes the relationship between value as given in this statement and the value of the named attribute in the object in which this statement is found. More than one descriptive statement for the same attribute name is permissible. Possible operators for relation are:

| Operator | Meaning |
| --- | --- |
| < | less than |
| <= | less than or equal to |
| > | greater than |
| >= | greater than or equal to |
| == | equal to |
| != | not equal to |
| ! | attribute not present |

If both value and relation are omitted, the meaning is "attribute present".

The interface Statement [description]

Ingredients, presences and una all have interfaces, which are attached to them as attributes using the interface statement. The interface statement is a pure description; that is, it may be interpreted as either a promise or a demand, depending upon the context.

The definition form of the interface statement is:

```
interface name {
    attribute*
}
``` where name is the symbolic name of the interface being defined. The allowed attributes are:

interface attribute (description)

method declaration (description)

The interface definition statement creates a named collection of method protocols. Each method declaration attribute adds a single method protocol to the interface. Each interface attribute adds the entire collection of method protocols from another interface to the interface.

Each method declaration takes the form:

methodname ( Error! Bookmark not defined. ) ;

where methodname is the name of the method and each parameter describes one of the parameters to the method, in the form:

type Error! Bookmark not defined.

where type is the parameter's data type and parametername is an (optional) name for the parameter (note that this is principally for documentation purposes since the parameter name as given in the interface is not used for anything).

The interface statement syntax is canonical. Its invocation form is:

interface interfacename ;

And its anonymous form is:

```
interface {
    attribute*
}
```

The interface attribute statement associates a given interface with the object in which it is used as an attribute. It is used in these statements:

ingredientKind definition
presenceKind definition
unumKind definition
interface definition (recursively)

The ingredientKind Statement [description]

The ingredientKind statement is used to describe ingredient kinds. The ingredientKind statement is a pure description; that is, it may be interpreted as either a promise or a demand, depending upon the context.

The definition form of the ingredientKind statement is:

```
ingredientKind name {
    attribute+
}
``` where name is the symbolic name of the ingredient kind being defined. The allowed attributes are:

interface attribute (description)
generic attribute (description)

The ingredientKind definition statement creates a named, abstract ingredient kind that consists of an interface and arbitrary descriptive attributes. Each ingredient kind must have at least one interface attribute to define its interface; additional interface attributes simply add methods to the interface. Any number of generic attributes (including none) are allowed.

The ingredientKind statement syntax is canonical. Its invocation form is:

ingredientKind name ;
And its anonymous form is:

```
ingredientKind {
    attribute+
}
```

The ingredientKind attribute statement associates a given ingredient kind with the object in which it is used as an attribute. It is used in these statements:

ingredientImpl definition
neighbor attribute

The ingredientImpl Statement [action]

The actual implementation of an ingredient is specified using the ingredientImpl statement. The ingredientImpl statement is an action; that is, it describes actual objects which may be instantiated and is qualified with promises and demands which determine the circumstances under which it may be used.

The definition form of the ingredientImpl statement is:

```
ingredientImpl name {
    attribute+
}
``` where name is the symbolic name of the ingredient implementation being defined. The allowed attributes are:

generic attribute (promise)
ingredientKind attribute (promise)
neighbor attribute (demand)
state attribute (action)
method attribute (action)
data attribute (action)

The ingredientImpl definition statement creates an actual ingredient implementation. It must have exactly one ingredientKind attribute and at least one implementation body attribute (method or data), but may have any number of generic, neighbor, or state attributes (possibly none).

The ingredientImpl statement syntax is canonical. Its invocation form is:

ingredientImpl name ;
And its anonymous form is:

```
ingredientImpl {
    attribute+
}
```

The ingredientImpl attribute statement provides the corresponding implementation to the object in which it is used as an attribute. It is used in this statement:

template attribute

The neighbor Attribute Statement [demand]

Methods in an ingredient implementation need to be able to send messages to other ingredients in the same presence, but must be coded without explicit foreknowledge of the environment in which the ingredient and its neighbor ingredients will be placed. An ingredient implementation may thus state requirements about what sorts of neighbors it must have in order to function properly, associating these neighbors with names by which its methods may refer to them. These neighbor requirements are expressed as attributes of the ingredient implementation with neighbor statements. The neighbor statement is a demand.

The neighbor statement, since it is only used as an attribute, has no definition form (and, consequently, no anonymous form either, since that would be meaningless). Its (non-canonical syntax) form is:

neighbor name kind where kind is an ingredientKind attribute, as described above, which states what kind of ingredient the neighbor must be, and name is the name by which the implementation will know the neighbor (i.e., methods of the ingredient implementation in which this neighbor attribute is found will use this symbol to refer to the neighbor ingredient).

An ingredient implementation specify as many neighbors as it likes, but they must all be given different names.

The neighbor attribute statement is only used in one statement:

ingredientImpl definition

The state Attribute Statement [action]

Ingredient implementations may have state bundles, which are collections of state variables that potentially may be shared across presences. These bundles of variables are described by state statements. The state statement is an action; that is, it describes actual components of an ingredient instance.

The state statement, since it is only used as an attribute, has no definition form (and, consequently, no anonymous form either). Its (non-canonical syntax) form is:

```
state name {
    variable⁺
}
``` where name is the name by which the ingredient implementation will know the state bundle and each variable is one of the variables in the bundle. Each of the latter is defined in turn by a statement of the form:

type varname ;

where type is the variable's type and varname is its name (i.e., the implementation's methods will use this symbol to refer to this variable).

An ingredient implementation may have as many state bundles as it likes, but they must all have different names. Furthermore, the variables within them must all have unique names.

The state attribute statement is only used in one statement:
   ingredientImpl definition The method Attribute Statement [action]

Ingredient implementations must include actual implementation! This typically consists of methods which realize the behavioral aspect of an ingredient instance's being. A method is declared with a method statement. The method statement is an action; that is, it describes actual code which is compiled into an ingredient implementation to be executed by the cyberspace agency runtime.

The method statement, since it is only used as an attribute, has no definition form (and, consequently, no anonymous form either). Its (non-canonical syntax) form is:

method Error! Bookmark not defined. methodname ( Error! Bookmark not defined. ) code where methodname and the parameters are exactly as described above in the discussion of the interface statement, language is an optional keyword expressing the form that code will take, and code is the actual code for the method. Pluribus is designed to operate, in principle at least, with code written in various different languages. Initially, of course, we will support just a few choices. The initial possibilities for language are e (the default), pseudo and foreign. If language is e, then code must be a method coded in E, delimited by braces ("{" and "}"). If language is pseudo, the method is pseudo-code, for documentary and code development purposes; the "code" itself must be delimited by braces but may consist of nearly anything. Pseudo-code will pass through the Pluribus compiler without complaint but does not generate any output (if an optional compiler switch is set, a pseudo-code method will trigger a warning). If language is foreign, then code must be a string giving the name of an external file from which to take a precompiled __whatever that means__ method in standard form followed by a semicolon (";"). I.e.:

```
method e methodname ( parameters ) {
    ecode
}
or
method foreign methodname ( parameters ) filename ;
```

An ingredient implementation's methods must conform to the interface specified by the ingredient kind; that is, there must be the same number of operations with the same names and parameters.

The method attribute statement is only used in one statement:
   ingredientImpl definition The data Attribute Statement [action]

Another form that ingredient implementations may take is blocks of static data. Such blocks are declared with a data statement. The data statement is an action; that is, it describes actual bits and bytes of data that will be incorporated in an ingredient implementation instance by the cyberspace agency runtime.

The data statement, since it is only used as an attribute, has no definition form (and, consequently, no anonymous form either). Its (non-canonical) syntax can take either of these two forms:

data { hexdata }
or
   data filename ;

where hexdata is a series of raw hexadecimal values giving the data values literally and filename is a string giving the name of an external (binary) file from which the data should be extracted. Raw hexadecimal consists of a series of case-insensitive hexadecimal digits (0–9 and A–F). The hex digits may be freely interspersed with whitespace and comments, but no other characters are allowed prior to the closing brace.

The data attribute statement is only used in one statement:
   ingredientImpl definition The presenceKind Statement [description]

The presenceKind statement is used to describe presence kinds. The presenceKind Statement is a pure description; that is, it may be interpreted as either a promise or a demand, depending upon the context.

The definition form of the presenceKind statement is:

```
presenceKind name {
    attribute⁺
}
``` where name is the symbolic name of the presence kind being defined. The allowed attributes are:
   interface attribute (description)
   generic attribute (description)

The presenceKind definition statement creates a named, abstract presence kind that consists of an interface and arbitrary descriptive attributes. Each presence kind must have at least one interface attribute to define its interface; additional interface attributes simply add methods to the interface. Any number of generic attributes (including none) are allowed.

The presenceKind statement syntax is canonical. Its invocation form is:
   presenceKind name ;
And its anonymous form is:

```
presenceKind {
    attribute⁺
}
```

The presenceKind attribute statement associates a given presence kind with the object in which it is used as an attribute. At least for now that is only one statement:
   presenceStructure definition The presenceStructure Statement [action]

The presenceStructure statement is used to describe the structure of a presence in terms of abstract ingredients. The presenceStructure statement is an action; that is, it describes actual presences which could be instantiated, given suitable ingredients.

The definition form of the presenceStructure statement is:

```
presenceStructure name {
    attribute⁺
}
``` where name is the symbolic name of the presence structure being defined. The allowed attributes are:
  presenceKind attribute (promise)
  role attribute (demand)
  deliver attribute (action)
  generic attribute (promise)
The presenceStructure definition statements creates a potential presence implementation. It must have exactly one presenceKind attribute. It also requires one deliver attribute for each method in its presence and unum interfaces.

The presenceStructure statement syntax is canonical. Its invocation form is:
  presenceStructure name ;
And its anonymous form is:

```
presenceStructure {
    attribute⁺
}
```

The presenceStructure attribute statement provides the corresponding presence structure to the object in which it is used as an attribute. It is used only in this statement:
  role attribute
The role Attribute Statement [demand]
A presence is composed of ingredients, each of which has a role in the presence. Analogously, an unum is composed of presences, each of which has a role in the unum. These roles are assigned with the role statement, which incorporates an ingredient or presence (by kind) into the presence or unum. The role statement is a demand.

The role statement, since it is only used as an attribute, has no definition form (and, consequently, no anonymous form either, since that would be meaningless). Its (non-canonical syntax) form is:
  role name kind
where name is the name by which the ingredient or presence will be known within the scope of the presence or unum, and kind is what sort of ingredient or presence it is, expressed as one of the attribute forms of an ingredientKind or presenceStructure statement. There must be one role attribute statement for each ingredient in the presence or presence in the unum.

The role attribute statement is used in these statements:
  presenceStructure definition
  unumStructure definition
The deliver Attribute Statement [action]
Presences and una are made from ingredients; in particular, messages sent to presences and una are delivered to ingredients. The deliver statement specifies how these messages are to be routed. The deliver statement is an action; that is, it describes the way an actual presence will be put together by the cyberspace agency runtime.

The deliver statement, since it is only used as an attribute, has no definition form (and, consequently, no anonymous form either, since that would be meaningless). Its (non-canonical syntax) form is:
  deliver scope what Error! Bookmark not defined. ;
where scope is either presence or unum, indicating which sort of message we are talking about delivering, what is the name of the message or interface being delivered, role is the name of the role of the ingredient to which it should be delivered, and receiver is the name of the method or interface to which it should be delivered (which must be a type match for what). If receiver is omitted, it is assumed to be the same as what. If role is also omitted, the Pluribus infers the ingredient by looking through all the ingredients for one with a method or interface with the same name as receiver; in such a case it is an error for there to be more than one possible match. Furthermore, a statement of the form:

deliver scope default Error! Bookmark not defined. ;
delivers all messages to scope whose delivery is not otherwise explicitly indicated as if you had written deliver scope what Error! Bookmark not defined. ;
for each such message.

The deliver attribute statement is only used in one statement:
  presenceStructure definition
The presenceImpl Statement [action]
The presenceImpl statement is used to describe presence implementations. The presenceImpl statement is an action; that is, it describes how actual presences will be instantiated by the cyberspace agency runtime.

The definition form of the presenceImpl statement is:

```
presenceImpl name {
    attribute⁺
}
``` where name is the symbolic name of the presence implementation being defined. The allowed attributes are:
  fill attribute (action)
  template attribute (action)
  generic attribute (promise)
The presenceImpl definition statement creates an actual presence implementation. It must have at least one fill attribute and it must have sufficient template attributes for all the ingredient roles in its structure. It may have any number of generic attributes (possibly none).

The presenceImpl statement is canonical. Its invocation form is:
  presenceImpl name ;
And its anonymous form is:

```
presenceImpl {
    attribute⁺
}
```

The presenceImpl attribute statement provides the corresponding implementation to the object in which it is used as an attribute. It is used in these statements:
  unumImpl definition
  prime attribute
The template Statement [action]
Each ingredient that is put into a presence implementation is described by a template statement that specifies how to instantiate the ingredient. The template statement is an action; that is, it describes the actual relationship of an ingredient implementation to the presence in which it is embedded.

The definition form of the template statement is:

```
template name {
    attribute⁺
}
``` where name is the symbolic name of the template being defined. The allowed attributes are:

fill attribute (action)

ingredientImpl attribute (action)

map attribute (action)

init attribute (action)

stateInit attribute (action)

The template definition statement creates an actual template object which may be incorporated into presences. It must have exactly one ingredientImpl attribute, but may have any number of the other attributes. However, all the templates in a presence implementation must collectively provide the proper fill attributes for the presence structure's defined roles, proper map attributes for all inter-ingredient messages, and proper stateInit attributes for the presence's state bundles.

The template statement is canonical. Its invocation form is:

template name ;

And its anonymous form is:

```
template {
    attribute⁺
}
```

The template attribute statement actually inserts the corresponding template into a presence. It is only used in one statement:

presenceImpl definition

The fill Attribute Statement [action]

A presence structure establishes roles for the various ingredients from which the presence is (abstractly) composed. Similarly, an unum structure establishes roles for the various presences from which the unum is composed. The fill statement assigns actual ingredient implementations or presence structures to those roles. The fill statement is an action; that is, it actually places ingredients or presences in particular roles in a presence or unum instance.

The fill statement, since it is only used as an attribute, has no definition form (and, consequently, no anonymous form either, since that would be meaningless). Its (non-canonical syntax) form is:

fill name ;

where name is the previously defined name of the role the ingredient implementation or presence structure with which the fill attribute is associated is to be assigned.

The fill attribute statement is used in these statements:

template attribute presenceImpl definition

The map Attribute Statement [action]

Ingredient roles and state bundles are known by one set of names within any particular ingredient and by a possibly different set of names in other ingredients. In order to have allow references to these to be correctly associated across ingredients, name mapping is required. The map statement does this. The map statement is an action; that is, it describes an actual association between names in different contexts within a presence.

The map statement, since it is only used as an attribute, has no definition form (and, consequently, no anonymous form either). Its (non-canonical syntax) form is:

map Error! Bookmark not defined. fromname Error! Bookmark not defined. ;

where scope is either neighbor or state, indicating which sort of name we are talking about mapping (the role name of a neighbor ingredient or the name of a state bundle, respectively), fromname is the name as it is known in the presence, and toname is the name as it is known in the ingredient whose template this map attribute is contained by. If toname is omitted, it is assumed to be the same as fromname (i.e., an identity mapping is used). If scope is omitted, Pluribus infers the scope by looking for fromname among both the neighbor role names and the state bundle names in the presence; in such a case it is an error for the same name to be used in both places. Furthermore, an attribute of the form:

map Error! Bookmark not defined. default ;

maps all names in scope whose mapping is not otherwise explicitly indicated as if you had written map Error! Bookmark not defined. fromname ;

for each such name.

The map attribute statement is only used in one statement:

template attribute

The init Attribute Statement [action]

Ingredients may have an initialization method which is invoked when the ingredient is instantiated. An init statement allows a template to specify the parameters to this method. The init statement is an action; that is, it specifies actual parameters to actually initialize an ingredient instance.

The init statement, since it is only used as an attribute, has no definition form (and, consequently, no anonymous form either). Its (non-canonical syntax) form is:

init value Error! Bookmark not defined.* ;

where the values are the parameters to pass to the initialization method. Each value should be a constant expression.

The init attribute statement is only used in one statement:

template attribute

The stateInit Attribute Statement [action]

The variables in an ingredient's state bundles also may be initialized. This is accomplished by the stateInit statement. The stateInit statement is an action; that is, it specifies actual initialization values to actually initialize a state bundle.

The stateInit statement, since it is only used as an attribute, has no definition form (and, consequently, no anonymous form either). Its (non-canonical syntax) form is:

```
stateInit name {
    initializer*
}
``` where name is the name of the state bundle and each initializer sets one of the variables in the bundle with a statement of the form:

varname = value ;

where varname is the variable's name and value is a constant expression containing the value to initialize the variable to.

The stateInit attribute statement is only used in one statement:

template attribute

The unumKind Statement [description]

The unumKind statement is used to describe unum kinds. The unumKind statement is a pure description; that is, it may be interpreted as either a promise or a demand, depending upon the context.

The definition form of the unumKind statement is:

```
unumKind name {
    attribute⁺
}
``` where name is the symbolic name of the unum kind being defined. The allowed attributes are:

interface attribute (description)

generic attribute (description)

The unumKind definition statement creates a named, abstract unum kind that consists of an interface and arbitrary descriptive attributes. Each unum kind must have at least one interface attribute to define its interface; additional interface attributes simply add methods to the interface. Any number of generic attributes (including none) are allowed.

The unumKind statement syntax is canonical. Its invocation form is:

unumKind name ;

And its anonymous form is:

```
unumKind {
    attribute⁺
}
```

The unumKind attribute statement associates a given unum kind with the object in which it is used as an attribute. It is used in this statement:

unumStructure definition

The unumStructure Statement [action]

The unumStructure statement is used to describe the structure of an unum in terms of abstract presences. The unumStructure statement is an action; that is, it describes actual una which could be instantiated, given suitable presences.

The definition form of the unumStructure statement is:

```
unumStructure name {
    attribute⁺
}
``` where name is the symbolic name of the unum structure being defined. The allowed attributes are:

unumKind attribute (promise)

role attribute (demand)

generic attribute (promise)

The unumStructure definition statements creates a potential unum implementation. It must have exactly one unumKind attribute.

The unumStructure statement syntax is canonical. Its invocation form is:

unumStructure name ;

And its anonymous form is:

```
unumStructure {
    attribute⁺
}
```

The unumStructure attribute statement provides the corresponding unum structure to the object in which it is used as an attribute. It is used only in this statement:

unumImpl definition

The unumImpl Statement [action]

The actual implementation of an unum is specified using the unumImpl statement. The unumImpl statement is an action; that is, it describes actual objects which may be instantiated and is qualified with promises and demands which determine the circumstances under which it may be used.

The definition form of the unumImpl statement is:

```
unumImpl name {
    attribute⁺
}
``` where name is the symbolic name of the unum implementation being defined. The allowed attributes are:

generic attribute (promise)

unumStructure attribute (promise)

presenceImpl attribute (action)

prime attribute (action)

The unumImpl definition statement creates an actual unum implementation. It must have exactly one unumStructure attribute and one prime attribute but can have any number of presenceImpl and generic attributes.

The unumImpl statement syntax is canonical. Its invocation form is:

unumImpl name ;

And its anonymous form is:

```
unumImpl {
    attribute⁺
}
```

The unumImpl attribute statement generates unum instances.

The prime Attribute Statement [action]

Of all the presences which compose an unum, one is considered to be the prime presence. This is the one that will be instantiated initially when the unum is instantiated. The prime presence of an unum implementation is denoted by a prime statement. The prime statement is an action; that is, it denotes an actual presence to instantiate upon unum creation.

The prime statement, since it is only used as an attribute, has no definition form (and, consequently, no anonymous form either, since that would be meaningless). Its (non-canonical syntax) form is:

prime presenceimpl where presenceImpl is a presenceImpl attribute, as described above.

The prime attribute statement is only used in one statement:

unumImpl definition

What is claimed is:

1. A data processing system comprising:

at least first and second data processing presences, a selected one of which for each unum includes a prime attribute, each of said at least first and second data processing presences being associated with a particular unum and each of said first and second data processing presences including a presence interface;

at least a single unum distributed at least in part over said at least first and second data processing presences, each of said at least a single unum including an unum interface; and a plurality of ingredients associated with selected ones of said at least first and second data processing presences, said plurality of ingredients including non-interface ingredients and interface ingredients, each of said non-interface ingredients adapted for communication with others of said non-interface ingredients, and each of said interface ingredients being adapted for mapping messages across unums and data processing presences;

each of said at least a single unum, each of said at least first and second data processing presences, and each of said plurality of ingredients, having an interface including attributes and methods, and each of said presence interfaces and said unum interfaces acting as a trust boundary.

2. The data processing system according to claim 1 further comprising kind, implementation, structure, and instance levels of particularity.

3. The data processing system according to claim 1, wherein each of said plurality of ingredients is run-time substitutable.

4. The data processing system according to claim 2 wherein said kind, implementation, and instance levels of particularity are ingredient characteristics.

5. The data processing system according to claim 2 wherein said kind, implementation, structure, and instance levels of particularity are presence characteristics.

6. The data processing system according to claim 2 wherein said kind, implementation, structure, and instance levels of particularity are unum characteristics.

7. The data processing system according to claim 4 wherein each said presence characteristic comprises a structure including a deliver specification for message routing.

8. The data processing system according to claim 5 wherein said presence structure includes unum presence method mappings with ingredients.

9. The data processing system according to claim 5 wherein said unum characteristics comprise structures including a deliver specification for message routing.

10. The data processing system according to claim 5 wherein said unum structure characteristic includes an indication of the presences with which the unum is associated.

* * * * *